United States Patent
Matsuura et al.

(10) Patent No.: US 11,726,203 B2
(45) Date of Patent: Aug. 15, 2023

(54) OBJECT DETECTION DEVICE

(71) Applicant: DENSO CORPORATION, Kariya (JP)

(72) Inventors: Mitsuyasu Matsuura, Nisshin (JP); Taketo Harada, Nisshin (JP); Dai Kondo, Kariya (JP); Takuya Nomura, Kariya (JP); Kenzo Kano, Kariya (JP)

(73) Assignee: DENSO CORPORATION, Kariya (JP)

( * ) Notice: Subject to any disclaimer, the term of this patent is extended or adjusted under 35 U.S.C. 154(b) by 735 days.

(21) Appl. No.: 16/698,240

(22) Filed: Nov. 27, 2019

(65) Prior Publication Data

US 2020/0096633 A1 Mar. 26, 2020

Related U.S. Application Data

(63) Continuation of application No. PCT/JP2018/019165, filed on May 17, 2018.

(30) Foreign Application Priority Data

May 30, 2017 (JP) ................................. 2017-106572

(51) Int. Cl.
*G01S 15/87* (2006.01)
*G01S 15/04* (2006.01)
*G01S 15/32* (2006.01)

(52) U.S. Cl.
CPC ............ *G01S 15/878* (2013.01); *G01S 15/04* (2013.01); *G01S 15/32* (2013.01)

(58) Field of Classification Search
None
See application file for complete search history.

(56) References Cited

U.S. PATENT DOCUMENTS

| 8,854,251 | B2 * | 10/2014 | Tokoro | G01S 13/34 342/28 |
| 2002/0023498 | A1 * | 2/2002 | Tsuzuki | G01N 29/12 73/609 |
| 2005/0041528 | A1 * | 2/2005 | Knittel | G01S 7/527 367/99 |
| 2013/0093614 | A1 * | 4/2013 | Tokoro | G01S 13/931 342/109 |

(Continued)

FOREIGN PATENT DOCUMENTS

| CN | 102906593 A | * | 1/2013 | ............... B60R 1/00 |
| CN | 102914346 A | * | 2/2013 | ............. G01F 23/28 |

(Continued)

*Primary Examiner* — Isam A Alsomiri
*Assistant Examiner* — Jonathan D Armstrong
(74) *Attorney, Agent, or Firm* — Maschoff Brennan

(57) ABSTRACT

An object detection device includes: a wave receiver that receives a reflected wave generated by reflection, by an object, of a transmission wave incident on the object; a determination section that determines whether, in a change over time in an amplitude of the reflected wave received by the wave receiver, an amplitude of a falling portion is greater than a predetermined criterion, the amplitude of the falling portion being decreased after the amplitude has reached a maximum value; and a processing section that, on the basis of a determination by the determination section that the amplitude of the falling portion is greater than the predetermined criterion, performs a process in which the object is treated as an object to be avoided.

8 Claims, 9 Drawing Sheets

(56) References Cited

U.S. PATENT DOCUMENTS

2015/0219760 A1  8/2015  Hiramaki et al.
2016/0069990 A1  3/2016  Harada et al.

FOREIGN PATENT DOCUMENTS

| | | | | |
|---|---|---|---|---|
| CN | 105264404 A | * | 1/2016 | ............ E03C 1/057 |
| DE | 112008003613 T5 | * | 11/2010 | ........... G01S 13/524 |
| DE | 102011075824 A1 | * | 11/2012 | ........... G01S 13/347 |
| DE | 112010005662 T5 | * | 3/2013 | ............. G01S 13/34 |
| DE | 102012221591 A1 | * | 5/2014 | ........... G01S 15/931 |
| EP | 1764630 A1 | | 3/2007 | |
| EP | 2372389 A1 | * | 10/2011 | ............ G01B 11/14 |
| GB | 2540749 A | | 2/2017 | |
| JP | 0539598 A1 | * | 5/1992 | ............ G01B 11/00 |
| JP | 2002323560 A | * | 11/2002 | |
| JP | 2014-058247 A | | 4/2014 | |
| JP | 2014-215283 A | | 11/2014 | |
| JP | 2019197027 A | * | 11/2019 | ........... G01S 13/282 |
| WO | WO-0248737 A1 | * | 6/2002 | ............. G01S 7/527 |
| WO | 2009013054 A1 | | 1/2009 | |
| WO | WO-2014135342 A1 | * | 9/2014 | ........... G01S 15/582 |
| WO | WO-2019216375 A1 | * | 11/2019 | ........... G01S 13/282 |

* cited by examiner

FIG.3
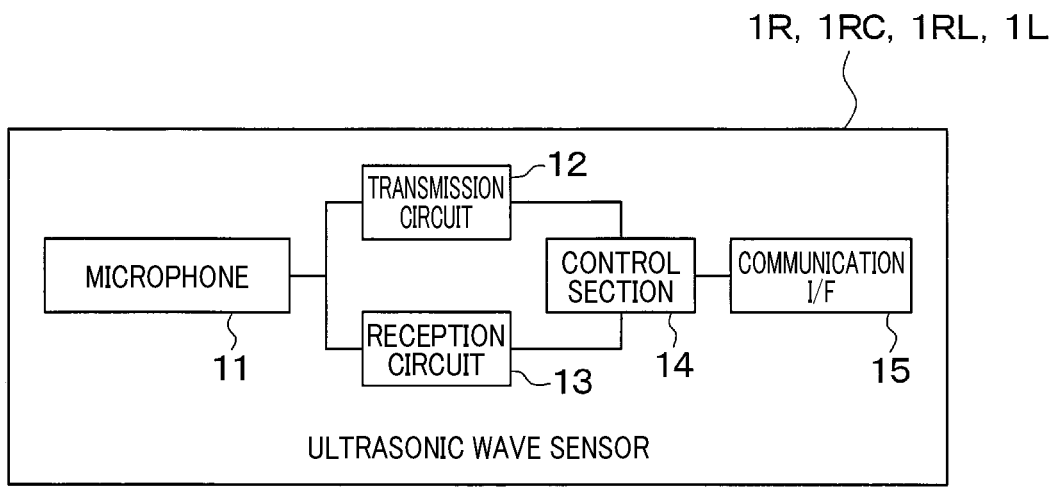
FIG.4
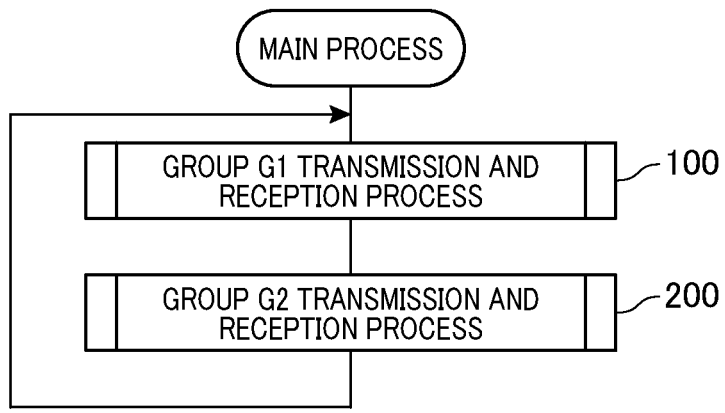
FIG.5
|  | G1 | G2 |
|---|---|---|
| 1R | RECEPTION |  |
| 1RC | TRANSMISSION AND RECEPTION | RECEPTION |
| 1LC | RECEPTION | TRANSMISSION AND RECEPTION |
| 1L |  | RECEPTION |

FIG.13
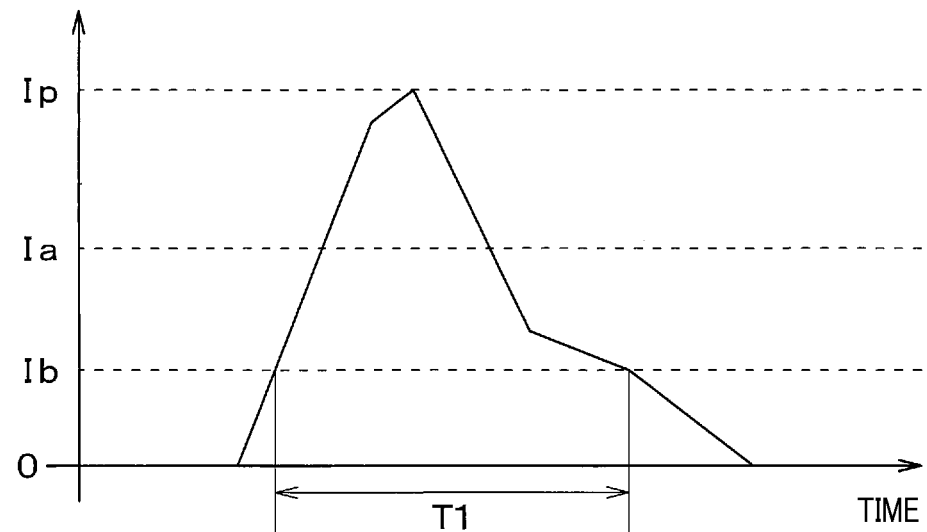
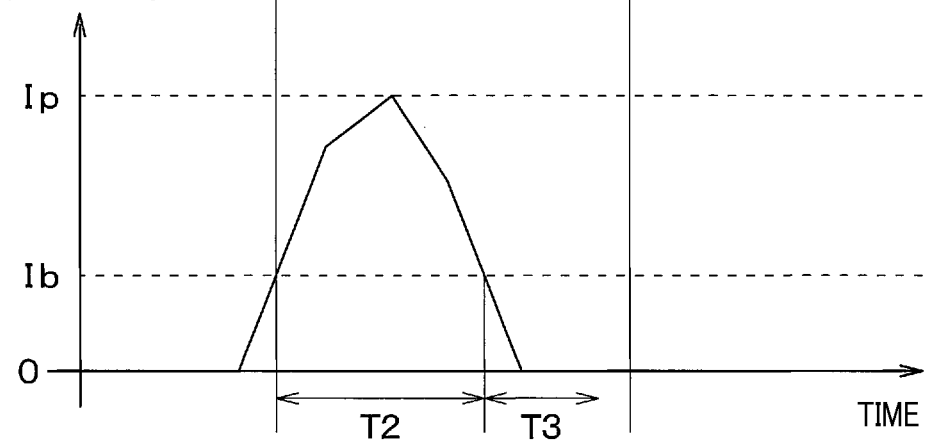

OBJECT DETECTION DEVICE

CROSS-REFERENCE TO RELATED APPLICATION

This application is based on and claims the benefit of priority from earlier Japanese Patent Application No. 2017-106572 filed on May 30, 2017, the contents of which are incorporated herein by reference.

BACKGROUND

Technical Field

The present disclosure relates to an object detection device.

Related Art

In a technique of detecting an object around a vehicle and notifying an occupant, the occupant may be unnecessarily notified if a step portion is low enough to not require avoidance by the vehicle. In a technique, on the basis of the number of maximal values of an amplitude in a change over time in a reflected wave generated by reflection, by an object, of a transmission wave incident on the object, it is determined whether a step portion is the object.

SUMMARY

As an aspect of the present disclosure, an object detection device is provided which includes: a wave receiver that receives a reflected wave generated by reflection, by an object, of a transmission wave incident on the object; a determination section that determines whether, in a change over time in an amplitude of the reflected wave received by the wave receiver, an amplitude of a falling portion is greater than a predetermined criterion, the amplitude of the falling portion being decreased after the amplitude has reached a maximum value; and a processing section that, on the basis of a determination by the determination section that the amplitude of the falling portion is greater than the predetermined criterion, performs a process in which the object is treated as an object to be avoided.

BRIEF DESCRIPTION OF THE DRAWINGS

In the accompanying drawings:

FIG. 3 is a configuration diagram of an ultrasonic wave sensor;

FIG. 4 is a flow chart of a main process;

FIG. 5 is a view showing usage of the ultrasonic wave sensors in a transmission and reception process of each group;

FIG. 13 shows graphs of changes over time in an amplitude of a reflected wave and a normalized transmission wave;

DETAILED DESCRIPTION OF THE PREFERRED EMBODIMENTS

In a technique of detecting an object around a vehicle and notifying an occupant, the occupant may be unnecessarily notified if a step portion is low enough to not require avoidance by the vehicle. In WO 2009/013054 A, on the basis of the number of maximal values of an amplitude in a change over time in a reflected wave generated by reflection, by an object, of a transmission wave incident on the object, it is determined whether a step portion is the object.

As a result of intensive studies, the inventors have found that a reflected wave from an object such as a wall to be avoided by the vehicle does not necessarily lead to a plurality of maximal values in a change over time in an amplitude of the reflected wave. This is because, for example, a wave reflected by the wall is a composite wave constituted by a plurality of reflected waves and the reflected waves interfere to strengthen or weaken each other.

In view of the above point, an object of the present disclosure is to provide a technique in which in an object detection device, on the basis of a characteristic other than a maximal value in a change over time in an amplitude of a reflected wave, an object such as a wall to be avoided by a vehicle is distinguished from a step portion that does not need to be avoided by the vehicle.

First Embodiment

Figure 1:
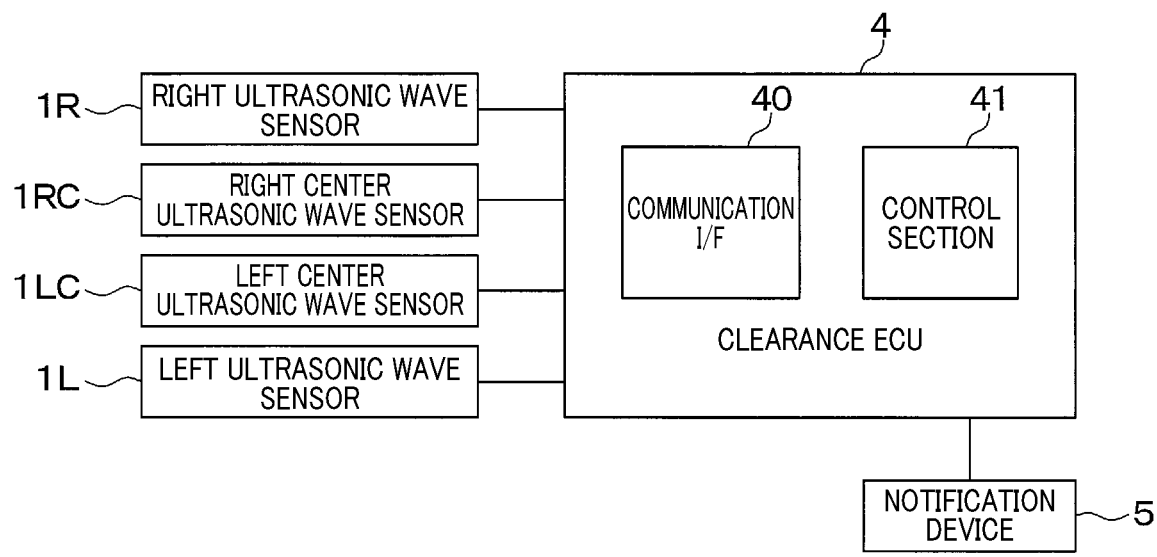
FIG. 1 is a configuration diagram of a vehicle obstacle detection device of a first embodiment.

A first embodiment will be described below. As shown in FIG. 1, a vehicle object detection device of the present embodiment is mounted on a vehicle, and includes a right ultrasonic wave sensor 1R, a right center ultrasonic wave sensor 1RC, a left center ultrasonic wave sensor 1LC, a left ultrasonic wave sensor 1L, a control ECU 4, and a notification device 5.

Figure 2:
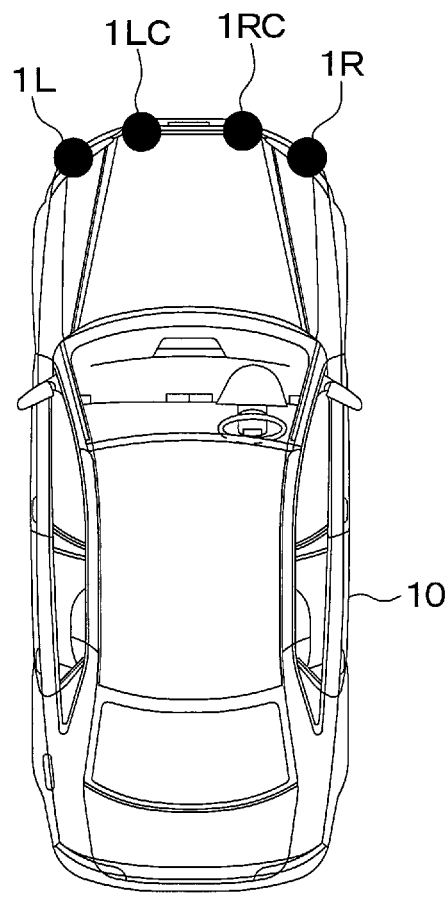
FIG. 2 is a view showing arrangement of ultrasonic wave sensors.

As shown in FIG. 2, the right ultrasonic wave sensor 1R, the right center ultrasonic wave sensor 1RC, the left center ultrasonic wave sensor 1LC, and the left ultrasonic wave sensor 1L are arranged on a bumper at a front end portion of the vehicle. More specifically, the left ultrasonic wave sensor 1L is arranged at a front left corner, the left center ultrasonic wave sensor 1LC is arranged on a left side of a front end center portion, the right center ultrasonic wave sensor 1RC is arranged on a right side of the front end center portion, and the right ultrasonic wave sensor 1R is arranged at a front right corner.

Positions in a vertical direction of the vehicle, i.e., a height and a mounting angle of the right ultrasonic wave sensor 1R, the right center ultrasonic wave sensor 1RC, the left center ultrasonic wave sensor 1LC, and the left ultrasonic wave sensor 1L are all symmetric with respect to a vehicle center line. As compared with when the positions are not symmetric, therefore, the right ultrasonic wave sensor 1R, the right center ultrasonic wave sensor 1RC, the left center ultrasonic wave sensor 1LC, and the left ultrasonic wave sensor 1L have a good appearance.

The right ultrasonic wave sensor 1R is capable of detecting an obstacle in a spatial region diagonally to the front right of the vehicle. The right center ultrasonic wave sensor 1RC is capable of detecting an obstacle in a spatial region slightly to the right of center in front of the vehicle. The left center ultrasonic wave sensor 1LC is capable of detecting an obstacle in a spatial region slightly to the left of center front of the vehicle. The left ultrasonic wave sensor 1L is capable of detecting an obstacle in a spatial region diagonally to the front left of the vehicle. The region in which the right center ultrasonic wave sensor 1RC is capable of detecting an obstacle partially overlaps the region in which the left center ultrasonic wave sensor 1LC is capable of detecting an obstacle.

As shown in FIG. 3, the right ultrasonic wave sensor 1R, the right center ultrasonic wave sensor 1RC, the left center ultrasonic wave sensor 1LC, and the left ultrasonic wave sensor 1L each include a microphone 11, a transmission circuit 12, a reception circuit 13, a control section 14, and a communication interface 15.

The microphone 11 vibrates according to a pulse signal applied by the transmission circuit 12 to generate a transmission wave which is an ultrasonic wave, and externally transmits the transmission wave. Furthermore, the microphone 11 receives an ultrasonic wave transmitted from the outside. The microphone 11 has narrower directivity in a plane orthogonal to the vehicle vertical direction than in the vehicle vertical direction. The microphone 11 corresponds to a wave receiver.

The microphone 11 converts the received ultrasonic wave into an electrical signal and outputs the electrical signal to the reception circuit 13. The ultrasonic wave received by the microphone 11 may be a reflected wave generated by reflection, by an obstacle, of the transmission wave incident on the obstacle, or may be another ultrasonic wave. For example, the ultrasonic wave received by the microphone 11 may be a reflected wave generated by reflection, by an obstacle, of a transmission wave that has been transmitted from an ultrasonic wave sensor other than the ultrasonic wave sensor to which the microphone 11 belongs and then incident on the obstacle.

When a transmission instruction signal is inputted from the control section 14, the transmission circuit 12 generates a pulse signal which is an electrical signal, and outputs the pulse signal to the microphone 11. The microphone 11 is driven by the pulse signal, and transmits a transmission wave of the same frequency as that of the pulse signal.

The reception circuit 13 performs amplification and A/D conversion to the electrical signal inputted from the microphone 11, and outputs, to the control section 14, a signal (hereinafter referred to as a reflected wave signal) subjected to amplification and A/D conversion.

The control section 14 is a microcomputer including a CPU, a RAM, a ROM, a flash memory, and the like. The RAM, the ROM, and the flash memory are each a non-transitory tangible storage medium.

When the control section 14 acquires, from the communication interface 15, a transmission command transmitted from the control ECU 4, the control section 14 outputs a transmission instruction signal to the transmission circuit 12. In some cases, from the communication interface 15, the control section 14 acquires a reception command transmitted from the control ECU 4. The reception command is a command instructing the ultrasonic wave sensor to only receive an ultrasonic wave without transmitting a transmission wave. An ultrasonic wave sensor located next to the ultrasonic wave sensor that has received the reception command transmits a transmission wave.

The control section 14 calculates a distance to an object on the basis of a time difference between a transmission timing at which a transmission wave is transmitted and a timing at which a reflected wave at a reception level equal to or greater than a sensor output threshold is received. Half of a value obtained by multiplying the time difference by the speed of sound is a distance to the obstacle. Hereinafter, the distance detected in this manner is referred to as a detection distance. The control section 14 transmits the calculated detection distance to the control ECU 4.

The transmission timing used to calculate the time difference is a time point at which the control section 14 has most recently acquired a transmission command or a reception command. Accordingly, the transmission timing at which the transmission wave is transmitted may be a transmission timing at which a transmission wave is transmitted from the microphone 11 belonging to the same ultrasonic wave sensor as the ultrasonic wave sensor to which the control section 14 belongs, or may be a transmission timing at which a transmission wave is transmitted from the microphone 11 belonging to an ultrasonic wave sensor different from the ultrasonic wave sensor to which the control section 14 belongs.

The time point at which the reflected wave equal to or greater than the sensor output threshold is received is a time point at which a reflected wave signal exceeds the sensor output threshold for the first time in a reflected wave detection period that starts at a timing at which detection of a reflected wave is started after a timing at which the transmission of the transmission wave is ended.

In the control section 14 that has received the transmission command, the timing at which the transmission of the transmission wave is ended is a timing at which the output of the pulse wave from the transmission circuit 12 to the microphone 11 is ended. In the control section 14 that has received the reception command, the timing at which the transmission of the transmission wave is ended is a time point at which a predetermined time period has elapsed from the reception of the reception command.

The time from the timing at which the transmission of the transmission wave is ended to the timing at which the detection of the reflected wave is started is a predetermined reverberation time. The reverberation indicates that, due to output of a transmission wave from the microphone 11, a diaphragm constituting the microphone 11 vibrates even after the output of the transmission wave.

The communication interface 15 transmits the detection distance calculated by the control section 14 to a communication interface 40 of the control ECU 4. Furthermore, the communication interface 15 receives a transmission command and a reception command transmitted from the communication interface 40 of the control ECU 4, and outputs the transmission command and the reception command to the control section 14.

As shown in FIG. 1, the control ECU 4 includes the communication interface 40 and a control section 41. The communication interface 40 is an interface circuit for communicating with the communication interface 15 of the ultrasonic wave sensors 1R, 1RC, 1LC, and 1L.

The control section 41 is a microcomputer including a CPU, a RAM, a ROM, a flash memory, and the like. The RAM, the ROM, and the flash memory are each a non-transitory tangible storage medium.

The notification device 5 is controlled by the control ECU 4, and notifies an occupant in a cabin of the vehicle by using one or both of an image and a sound.

A process performed by the control section 14 of the ultrasonic wave sensors 1R, 1RC, 1LC, and 1L and a process performed by the control ECU 4 will be described below. The control section 41 executes a predetermined program so that the control ECU 4 performs a main process shown in FIG. 4. In a single main process, first, at step 100, the control ECU 4 performs a group G1 transmission and reception process, and subsequently, at step 200, the control ECU 4 performs a group G2 transmission and reception process. After step 200, the control returns to step 100.

In each of the group G1 transmission and reception process and the group G2 transmission and reception process, the control ECU 4 causes at least one of the ultrasonic wave sensors 1R, 1RC, 1LC, and 1L to transmit a transmission wave, and attempts to receive a reflected wave by three of the ultrasonic wave sensors 1R, 1RC, 1LC, and 1L.

Specifically, as shown in FIG. 5, in the group G1 transmission and reception process, the control ECU 4 performs control so that the right center ultrasonic wave sensor 1RC transmits a transmission wave and the right ultrasonic wave sensor 1R, the right center ultrasonic wave sensor 1RC, and the left center ultrasonic wave sensor 1LC receive a reflected wave caused by the transmission wave. Thus, in the group G1 transmission and reception process, the right center ultrasonic wave sensor 1RC is used to receive a direct wave, and the right ultrasonic wave sensor 1R and the left center ultrasonic wave sensor 1LC are used to receive an indirect wave.

Furthermore, in the group G2 transmission and reception process, the control ECU 4 performs control so that the left center ultrasonic wave sensor 1LC transmits a transmission wave, and the right center ultrasonic wave sensor 1RC, the left center ultrasonic wave sensor 1LC, and the left ultrasonic wave sensor 1L receive a reflected wave caused by the transmission wave. Thus, in the group G3 transmission and reception process, the left center ultrasonic wave sensor 1LC is used to receive a direct wave, and the right center ultrasonic wave sensor 1RC and the left ultrasonic wave sensor 1L are used to receive an indirect wave.

When a transmission wave transmitted from an ultrasonic wave sensor is reflected by an obstacle so that a reflected wave is generated, and the reflected wave is received by the ultrasonic wave sensor which was the transmission source of the transmission wave, the reflected wave is a direct wave. Furthermore, when a transmission wave transmitted from an ultrasonic wave sensor is reflected by an obstacle so that a reflected wave is generated, and the reflected wave is received by another ultrasonic wave sensor which was not the transmission source of the transmission wave, the reflected wave is an indirect wave.

Figure 6:
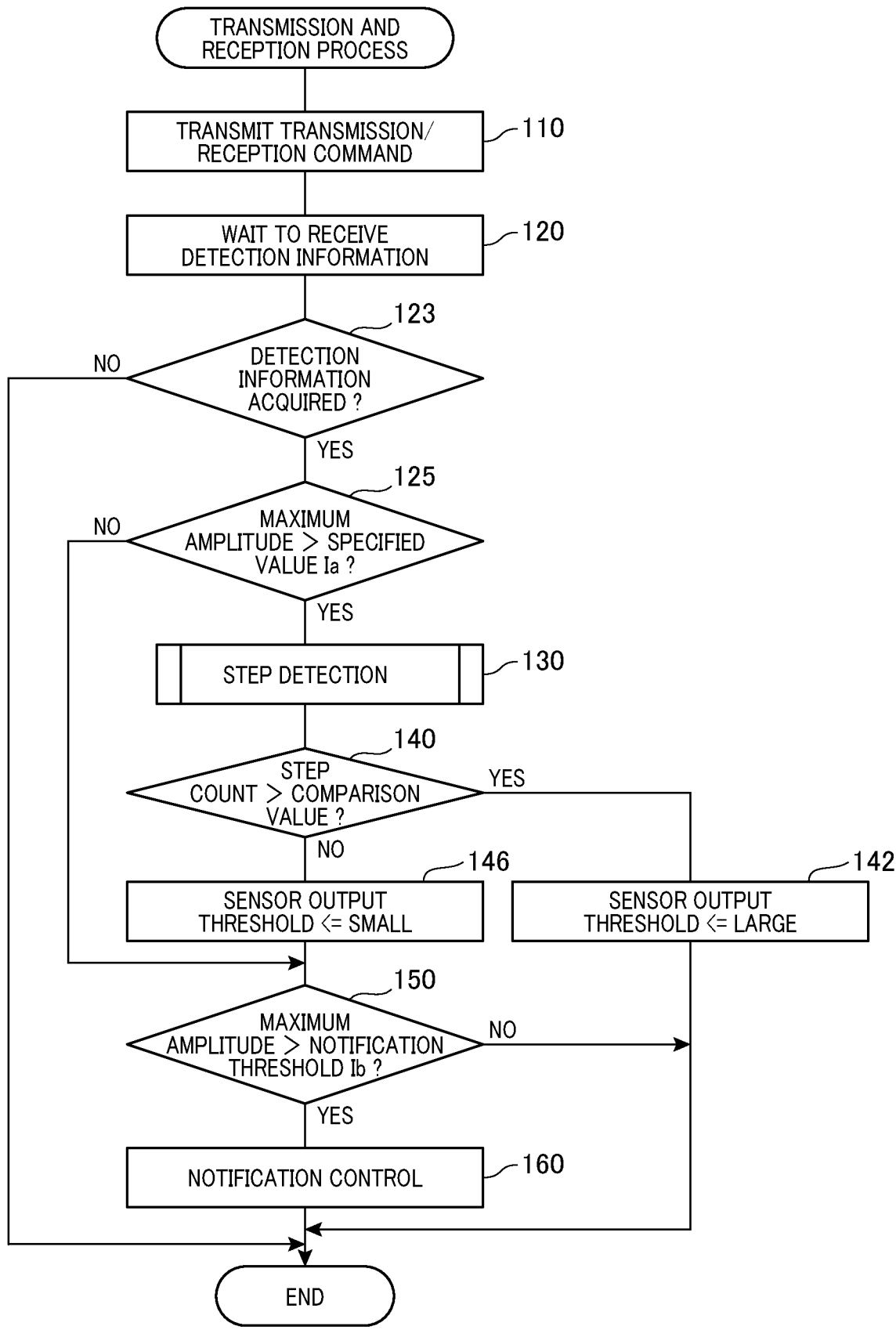
FIG. 6 is a flow chart of the transmission and reception process.
Figure 7:
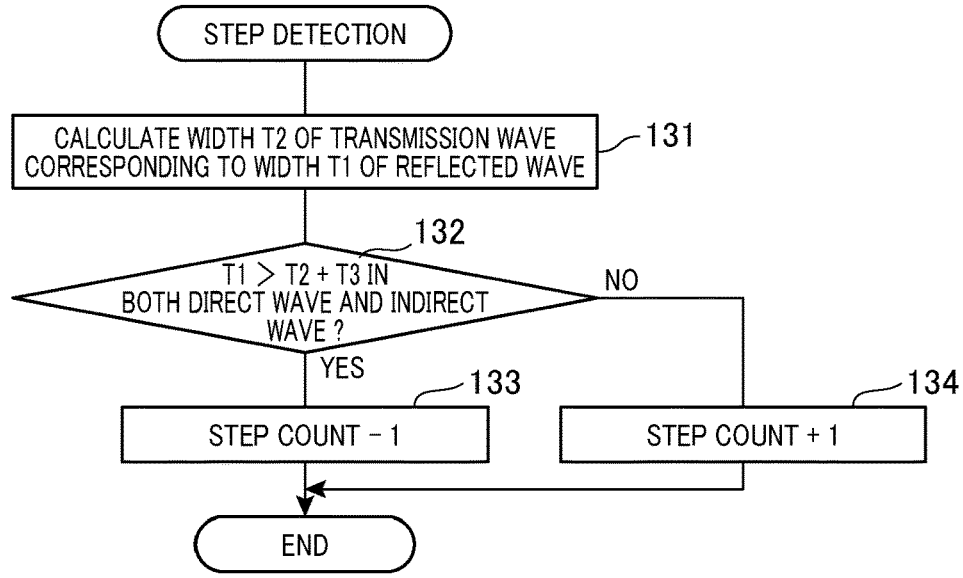
FIG. 7 is a flow chart of a step detection process.

In each of the group G1 transmission and reception process and the group G2 transmission and reception process, the control ECU 4 performs a transmission and reception process shown in FIG. 6. The control section 41 executes a predetermined program so that the transmission and reception process shown in FIG. 6 is performed. FIG. 7 is a flow chart of a step detection process which is a part of the transmission and reception process.

First, at step 110, the control ECU 4 transmits only a reception command or both a transmission command and a reception command to one or more of the ultrasonic wave sensors 1R, 1RC, 1LC, and 1L. The transmission command is transmitted to all the ultrasonic wave sensors used to receive a direct wave in the current transmission and reception process. The reception command is transmitted to all the ultrasonic wave sensors used to receive an indirect wave in the current transmission and reception process.

For example, in the group G1 transmission and reception process, a transmission command is transmitted only to the right center ultrasonic wave sensor 1RC, and a reception command is transmitted only to the right ultrasonic wave sensor 1R and the left center ultrasonic wave sensor 1LC. For example, in the group G2 transmission and reception process, a transmission command is transmitted only to the left center ultrasonic wave sensor 1LC, and a reception command is transmitted only to the right center ultrasonic wave sensor 1RC and the left ultrasonic wave sensor 1L. Thus, in each of the ultrasonic wave sensors to which the transmission command is transmitted, the control section 14 acquires the transmission command through the communication interface 15.

Figure 8:
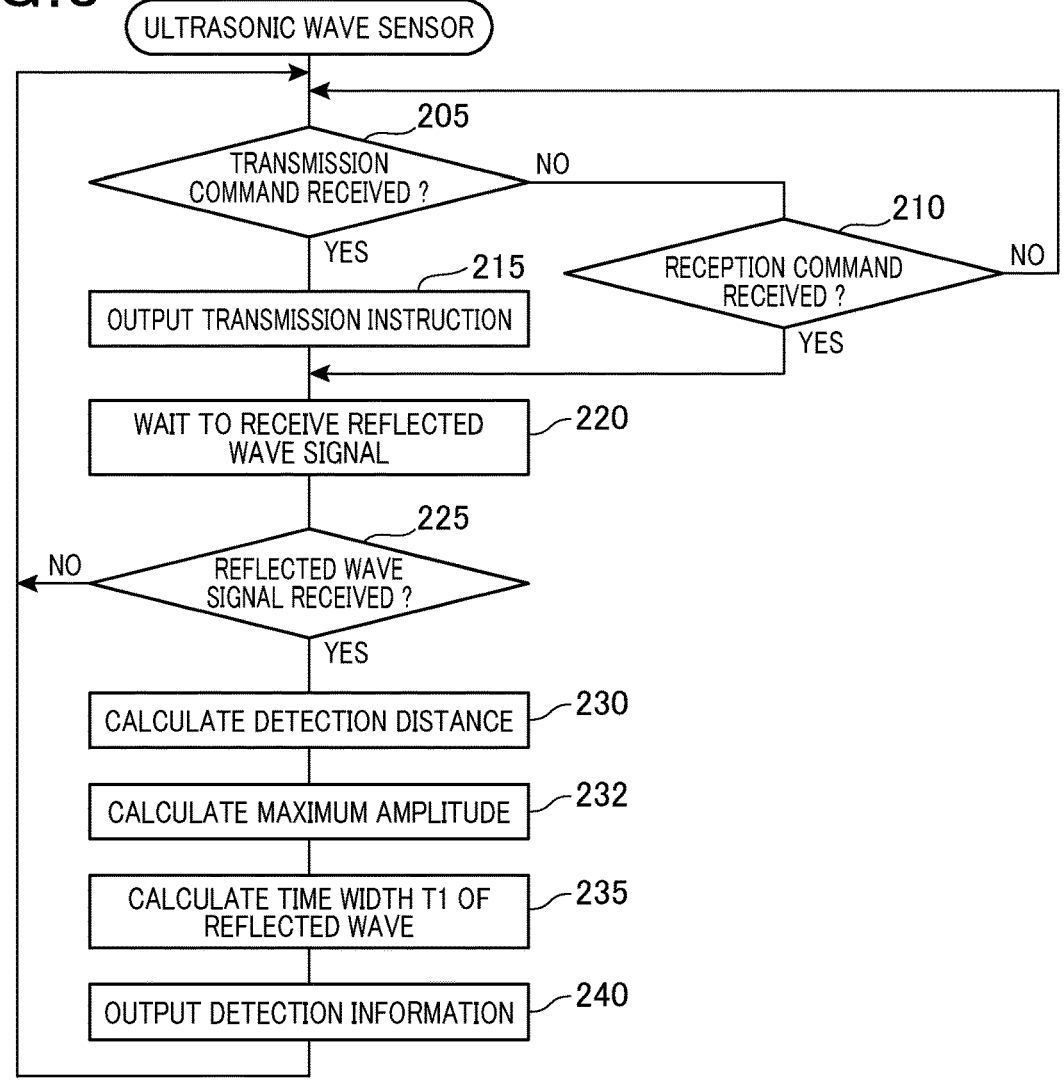
FIG. 8 is a flow chart of a process performed by a control section of the ultrasonic wave sensors.

In each of the ultrasonic wave sensors 1R, 1RC, 1LC, and 1L, the control section 14 performs a process shown in FIG. 8. First, at step 205, the control section 14 determines whether a transmission command has been received from the control ECU 4. When no transmission command has been received, the control proceeds to step 210, and when a transmission command has been received, the control proceeds to step 215. At step 210, the control section 14 determines whether a reception command has been received from the control ECU 4. When no reception command has been received, the control returns to step 205, and when a reception command has been received, the control proceeds to step 220.

When the control section 14 has received neither a transmission command nor a reception command, therefore, steps 205 and 210 are repeated. In each of the ultrasonic wave sensors to which a transmission command is transmitted, when the control section 14 acquires a transmission command through the communication interface 15 while steps 205 and 210 are repeated, the control proceeds from step 205 to step 215.

At step 215, the control section 14 outputs a transmission instruction signal to the transmission circuit 12 belonging to the same ultrasonic wave sensor as the ultrasonic wave sensor to which the control section 14 belongs. Thus, the transmission circuit 12 generates a pulse signal, and outputs the pulse signal to the microphone 11 belonging to the same ultrasonic wave sensor as the ultrasonic wave sensor to which the transmission circuit 12 belongs. The microphone 11 is driven by the pulse signal, and transmits a transmission wave. The number of pulses used to drive the microphone 11 is, for example, approximately 8 to 40, and a frequency used to drive the microphone 11 is approximately 40 to 70 kHz. When the transmission wave is incident on an object (e.g., an obstacle) around the vehicle and is reflected by the object, a reflected wave is generated. The reflected wave reaches, as a direct wave, the microphone 11 which was the transmission source of the transmission wave that has caused the reflected wave. In some cases, the reflected wave reaches, as an indirect wave, the microphone 11 which was not the transmission source of the transmission wave that has caused the reflected wave.

When the microphone 11 which was the transmission source of the transmission wave receives a direct wave, the microphone 11 outputs an electrical signal indicating the direct wave to the reception circuit 13 belonging to the same ultrasonic wave sensor as the ultrasonic wave sensor to which the microphone 11 belongs. Then, the reception circuit 13 outputs a reflected wave signal corresponding to the electrical signal to the control section 14 belonging to the same ultrasonic wave sensor as the ultrasonic wave sensor to which the reception circuit 13 belongs.

When the control proceeds from step 215 to step 220, the control section 14 waits for a predetermined waiting time to receive a reflected wave (i.e., a direct wave). When the control section 14 receives a direct wave as described above, or when, before the control section 14 receives a direct wave, the waiting time has elapsed from the output of the transmission instruction, the control proceeds to step 225. At step 225, the control section 14 determines whether a reflected wave signal having a maximum amplitude exceeding the sensor output threshold has been received. When such a reflected wave signal has been received, the control proceeds to step 230, and when such a reflected wave signal has not been received, the control returns to step 205.

At step 230, on the basis of the received reflected wave signal and, as described above, on the basis of a time difference between a time point at which the transmission command has been acquired and a timing at which the direct wave at the reception level equal to or greater than the sensor output threshold is received, the control section 14 calculates a detection distance. Subsequently, at step 232, on the basis of the received reflected wave signal, a maximum amplitude of the reflected wave is calculated.

Subsequently, at step 235, on the basis of the reflected wave signal, a duration of the reflected wave is calculated. Significance of the calculation of the duration of the reflected wave will be described below. The duration of the reflected wave is calculated to determine whether the detected object is a low step portion.

The low step portion is a step portion on a road or a ceiling that is low enough to not require avoidance by the vehicle. The low step portion may be, for example, a curb, a wheel stopper, a manhole cover, a ditch, a ceiling beam, or the like.

If such a step portion is detected as an obstacle and notification to the occupant of the vehicle or braking is performed, the occupant is annoyed. Thus, on the basis of a change over time in an amplitude of a reflected wave, a high obstacle such as a wall to be avoided by the vehicle is distinguished from a low step portion with which the vehicle is unlikely to come into contact and that thus does not need to be avoided by the vehicle. The duration is a representative amount of change over time in the amplitude of the reflected wave.

Figure 9:
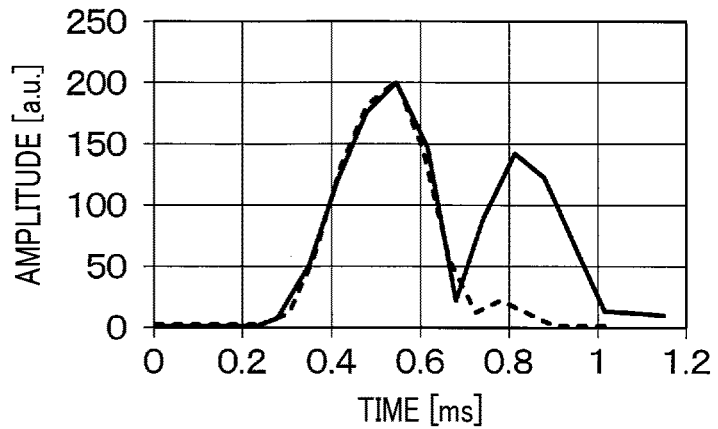
FIG. 9 is a graph showing changes over time in an amplitude of a reflected wave generated by a low step portion and a reflected wave generated by a wall.
Figure 10:
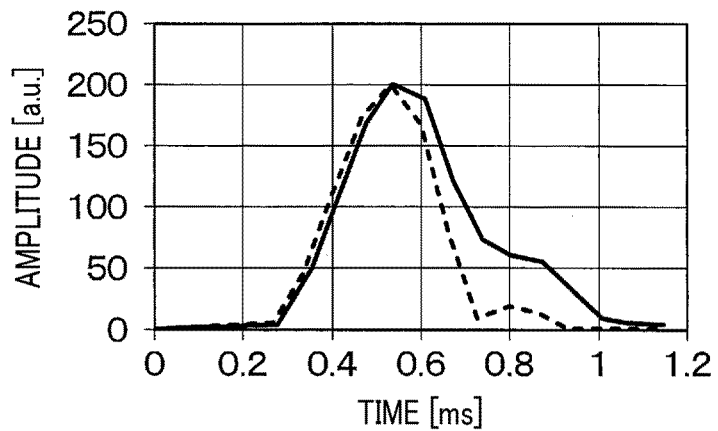
FIG. 10 is a graph showing changes over time in an amplitude of a reflected wave generated by the low step portion and a reflected wave generated by the wall.

In graphs shown in FIGS. 9 and 10, a reflected wave generated by reflection, by a low step portion, of a transmission wave incident on the low step portion is indicated by a dashed line. Furthermore, a reflected wave generated by reflection, by a wall to be avoided by the vehicle, of a transmission wave incident on the wall is indicated by a solid line. The horizontal axis indicates time, and the vertical axis indicates an amplitude of the reflected wave. The solid line and the dashed line are both an envelope of the reflected wave. The reflected waves indicated by the solid line and the dashed line are both normalized so that maximum amplitudes and durations thereof are the same.

As shown in FIGS. 9 and 10, as compared with the reflected wave generated by the low step portion, the reflected wave generated by the wall has a greater amplitude in a tail portion. The tail portion is, in a change over time in an amplitude of the reflected wave, a portion after the amplitude has reached a maximum value. Furthermore, as compared with the reflected wave generated by the low step portion, the reflected wave generated by the wall has a greater amplitude in a falling portion of the tail portion. The falling portion is a portion that is a part of the tail portion after the amplitude has reached the maximum value and in which the amplitude is decreased over time. In FIG. 10, the falling portion is the entire tail portion. In FIG. 9, the falling portion is a portion excluding a portion of the tail portion in a time period from a time point at which the amplitude has reached a minimal value to a time period at which the amplitude has reached a maximal value.

Figure 11:
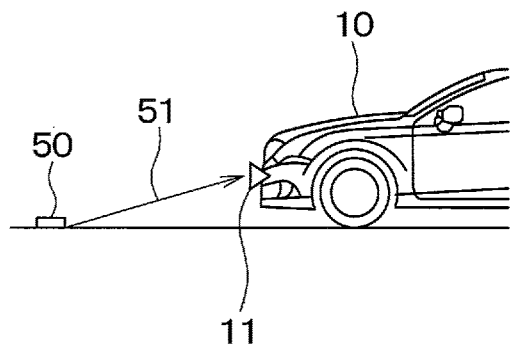
FIG. 11 is a schematic diagram showing a case where a reflected wave is generated by the low step.

The above difference occurs for the following reason. As shown in FIG. 11, with regard to a reflected wave 51 which is generated by reflection by a low step portion 50 and reaches the microphone 11 of the ultrasonic wave sensor, the step portion 50 is small in the vehicle vertical direction. Accordingly, only a reflected wave from a base of the step portion 50 reaches the microphone 11 from the step portion 50.

Figure 12:
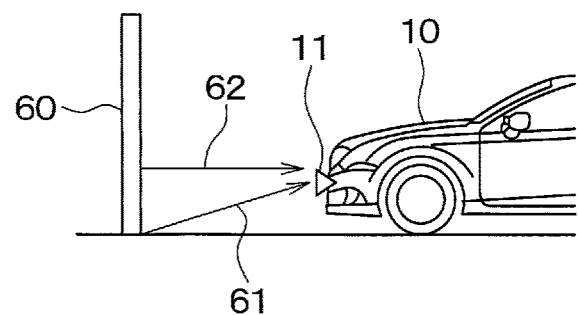
FIG. 12 is a schematic diagram showing a case where a reflected wave is generated by the wall.

On the other hand, as shown in FIG. 12, a wall 60 to be avoided by the vehicle is long in the vehicle vertical direction. Accordingly, two reflected waves, i.e., a reflected wave from a base of the wall 60 and a reflected wave from a portion of the wall 60 in front of the microphone 11 reach the microphone 11 from the wall 60. Thus, a composite wave of the reflected wave from the base and the reflected wave from the front reaches the microphone 11 from the wall 60.

As a result, as compared with the reflected wave generated by the low step portion 50, in the reflected wave generated by the wall 60, the amplitude is greater in the falling portion and in the portion of the tail portion other than the falling portion, and a duration of the tail portion is longer.

In the example in FIG. 9, the amplitude of the reflected wave generated by reflection by the wall has two maximal values. In the example in FIG. 10, however, the amplitude of the reflected wave from the wall has only one maximal value. In both the examples in FIGS. 9 and 10, the vehicle object detection device of the present embodiment is capable of detecting a reflected wave from the wall as the reflected wave from the wall.

The control section 14 uses a duration of a reflection width in order to determine whether an amplitude of a falling portion is greater than a criterion. As shown in FIG. 13, the duration of the reflected wave is a duration T1, in a change over time in the amplitude of the reflected wave, from a time point at which the amplitude is increased to a first value Ib before the amplitude reaches a maximum value to a time point at which the amplitude is decreased to a second value Ib in the falling portion. In the present embodiment, the first value Ib and the second value Ib are the same value greater than zero. As another example, however, the first value Ib may be greater or smaller than the second value Ib. In the present embodiment, the first value Ib and the second value Ib are the same value as a notification threshold Ib described later. As another example, however, the first value Ib and the second value Ib may be greater or smaller than the notification threshold Ib.

Subsequently, at step 240, detection information is outputted to the control ECU 4, and the control returns to step 205. The detection information includes the detection distance calculated at immediately preceding step 230, the maximum amplitude calculated at immediately preceding step 232, and the duration T1 calculated at immediately preceding step 235.

Furthermore, in each of the ultrasonic wave sensors to which a reception command is transmitted, when the control section 14 acquires a reception command through the communication interface 15 while steps 205 and 210 are repeated, the control proceeds from step 210 to step 220.

When the control proceeds from step 210 to step 220, the control section 14 waits for the predetermined waiting time to receive a reflected wave (i.e., an indirect wave). When the control section 14 receives an indirect wave as described above, or when, before the control section 14 receives an indirect wave, the waiting time has elapsed from the output of the reception instruction, the control proceeds to step 225. At step 225, the control section 14 determines whether a reflected wave signal has been received. When a reflected wave signal has been received, the control proceeds to step 230, and when a reflected wave signal has not been received, the control returns to step 205.

At step 230, on the basis of the received reflected wave signal and, as described above, on the basis of a time difference between a time point at which the reception command has been acquired and a timing at which the indirect wave at the reception level equal to or greater than the sensor output threshold is received, the control section 14 calculates a detection distance. Subsequently, at step 232, on the basis of the received reflected wave signal, a maximum amplitude of the reflected wave is calculated.

Subsequently, at step 235, similarly to when a direct wave is received, a duration T1 of the reflected wave is calculated on the basis of the reflected wave signal. Significance of the calculation of the duration T1 of the reflected wave is the same as when a direct wave is received. Subsequently, at step 240, detection information is outputted to the control ECU 4, and the control returns to step 205. The detection information includes the detection distance calculated at immediately preceding step 230, the maximum amplitude calculated at immediately preceding step 232, and the duration T1 calculated at immediately preceding step 235.

On the other hand, after the transmission/reception command is transmitted at step 110, at step 120, the control ECU 4 waits for a predetermined time period to receive detection information from the ultrasonic wave sensors 1R, 1RC, 1LC, and 1L. Until the predetermined time period has elapsed from the transmission of the transmission/reception command, even after detection information is received, the control ECU 4 continues to wait to receive detection information.

Detection information that may be received when step 120 is performed once is different depending on a group of the transmission and reception process to which step 120 belongs.

For example, at step 120 in the group G1 transmission and reception process, at maximum, the control ECU 4 acquires three pieces of detection information in total, i.e., one piece of detection information on a direct wave from the right center ultrasonic wave sensor 1RC, one piece of detection information on an indirect wave from the right ultrasonic wave sensor 1R, and one piece of detection information on an indirect wave from the left center ultrasonic wave sensor 1LC.

Furthermore, at step 120 in the group G2 transmission and reception process, at maximum, the control ECU 4 acquires three pieces of detection information in total, i.e., one piece of detection information on an indirect wave from the right center ultrasonic wave sensor 1RC, one piece of detection information on a direct wave from the left center ultrasonic wave sensor 1LC, and one piece of detection information on an indirect wave from the left ultrasonic wave sensor 1L.

In the group G1 transmission and reception process and the group G2 transmission and reception process, when an object on which a transmission wave transmitted from an ultrasonic wave sensor is incident is present neither within a range reachable by the transmission wave nor within a predetermined distance from the ultrasonic wave sensor, the control ECU 4 may receive no detection information. Furthermore, in the group G1 transmission and reception process and the group G2 transmission and reception process, the control ECU 4 may receive only one piece of detection information on a direct wave, or may receive only one piece of detection information on an indirect wave.

When the predetermined time period has elapsed from the transmission of the transmission/reception command from the control ECU 4, the control proceeds from step 120 to step 123. At step 123, it is determined whether one or more pieces of detection information have been acquired at immediately preceding step 120. When no detection information has been acquired, the current transmission and reception process ends, and when one or more pieces of detection information have been acquired, the control proceeds to step 125.

At step 125, it is determined whether the maximum amplitude is greater than a specified value Ia. The specified value Ia is a value greater than any of the first value Ib, the second value Ib, and the notification threshold Ib.

When only one piece of detection information has been acquired at immediately preceding step 120, the maximum amplitude which is a determination target is a maximum amplitude included in the one piece of detection information. When two pieces of detection information have been acquired at immediately preceding step 120, the maximum amplitude which is the determination target may be a larger maximum amplitude or a smaller maximum amplitude of two maximum amplitudes included in the two pieces of detection information.

When the maximum amplitude which is the determination target is greater than the specified value Ia, the control proceeds to step detection at step 130. When the maximum amplitude which is the determination target is equal to or smaller than the specified value Ia, the step detection at step 130 is bypassed, and the control proceeds to step 150.

Thus, when the maximum amplitude which is the determination target is greater than the specified value Ia, the step detection is performed, and when the maximum amplitude which is the determination target is equal to or smaller than the specified value Ia, no step detection is performed. In this manner, by excluding a reflected wave having a small amplitude from the information for the step detection, accuracy of the step detection can be improved.

In the step detection at step 130, the control ECU 4 performs the process shown in FIG. 7. Specifically, first, at step 131, the control ECU 4 reads a duration T1 included in all the detection information acquired at immediately preceding step 120. For each of the one or more read durations T1, the control ECU 4 calculates a duration T2 of a transmission wave corresponding to the duration T1.

A method of calculating a duration T2 of a transmission wave corresponding to a duration T1 will be described below. In the ROM or the flash memory of the control section 41 of the control ECU 4, information on the change over time in the amplitude of the transmission wave transmitted from the ultrasonic wave sensors 1R, 1RC, 1LC, and 1L is stored in advance.

At step 131, the control ECU 4 reads the information, and multiplies, by the same coefficient, an amplitude at each time in the change over time in the amplitude of the transmission wave so that a maximum value in the change over time is the same value as a maximum amplitude of the reflected wave achieving the duration T1. The maximum amplitude of the reflected wave achieving the duration T1 is a maximum amplitude included in the same detection information as the detection information in which the duration T1 is included. In other words, the control ECU 4 normalizes the amplitude of the transmission wave so that the maximum value in the change over time in the amplitude of the transmission wave is the same value as a maximum amplitude Ip of the reflected wave achieving the duration T1.

Thus, as shown in FIG. 13, the normalized amplitude of the transmission wave having the maximum amplitude Ip is obtained. The control ECU 4 calculates a duration T2, in a change over time in the normalized amplitude of the transmission wave, from a time point at which the amplitude is increased to the first value Ib before the amplitude reaches the maximum value Ip to a time point at which the amplitude is decreased to the second value Ib in the falling portion. The calculated duration T2 is a duration corresponding to the duration T1.

By such a process, at step 131, the control ECU 4 obtains the duration T2 of the transmission wave corresponding to each of all the durations T1 acquired at immediately preceding step 120.

At subsequent step 132, different determinations are performed depending on whether, at immediately preceding step 120, the control ECU 4 has acquired both detection information on a direct wave and detection information on an indirect wave or the control ECU 4 has acquired only one of the detection information on a direct wave and the detection information on an indirect wave. The direct wave and the indirect wave are almost always reflected waves generated by reflection by the same object.

Specifically, when the control ECU 4 has acquired only one of the detection information on a direct wave and the detection information on an indirect wave, the control ECU 4 determines whether, with regard to any one of the acquired detection information on the reflected wave, the duration T1 of the reflected wave included in the detection information is longer than a reference length. The reference length is a value obtained by adding a constant value T3 to the duration T2 corresponding to the duration T1 which is a comparison target. Then, the control ECU 4 determines whether the duration T1 is greater than the reference length T2+T3. When the duration T1 is greater than the reference length T2+T3, the control proceeds to step 132, and when the duration T1 is not greater than the reference length T2+T3, the control proceeds to step 134.

The determination is performed in this manner because when a duration T1 of a reflected wave is greater than a reference length T2+T3 corresponding to the duration T1, in a change over time in an amplitude achieving the duration T1, an amplitude of a falling portion is highly likely to be greater than a predetermined criterion. This is because, as shown in FIG. 13, a greater amplitude of the falling portion of the reflected wave tends to cause the duration T1 to be longer relative to the duration T2 of the normalized transmission wave. Thus, the determination using the duration allows indirect determination on the amplitude.

When the relationship T1>T2+T3 is satisfied in both the direct wave and the indirect wave reflected by the same object, in the change over time in the amplitude achieving the duration T1, the amplitude of the falling portion is more likely to be greater than the predetermined criterion.

Furthermore, when the control ECU 4 has acquired both the detection information on a direct wave and the detection information on an indirect wave, at step 132, the control ECU 4 determines whether, with regard to the detection information on a direct wave and any one of the detection information on an indirect wave of the acquired detection information, the duration T1 of the reflected wave included in the detection information is longer than the reference length. Then, the control ECU 4 determines whether, for both the direct wave and the indirect wave, the duration T1 is greater than the reference length T2+T3. In this case, the criterion in which the duration T1 is greater than the reference length T2+T3 constitutes a part of the predetermined criterion.

When the duration T1 is greater than the reference length T2+T3 for both the direct wave and the indirect wave, the control proceeds to step 133. When the duration T1 is greater than the reference length T2+T3 for only one of the direct wave and the indirect wave, the control proceeds to step 134. Also when the duration T1 is greater than the reference length T2+T3 for neither of the direct wave and the indirect wave, the control proceeds to step 134.

Thus, when the control ECU 4 has acquired both the detection information on a direct wave and the detection information on an indirect wave, the following correspondence relationships are established. First, the falling portion in the change over time in the amplitude of the direct wave corresponds to a first falling portion. Furthermore, the predetermined criterion to which the detection information on the direct wave is applied corresponds to a first predetermined criterion. Furthermore, the microphone 11 that transmits the transmission wave and receives the direct wave corresponds to a first wave receiver.

The falling portion in the change over time in the amplitude of the indirect wave corresponds to a second falling portion. Furthermore, the predetermined criterion to which the detection information on the indirect wave is applied corresponds to a second predetermined criterion. Furthermore, the microphone 11 that receives the indirect wave corresponds to a second wave receiver.

In the present embodiment, the first predetermined criterion is the same as the second predetermined criterion, but as another example, the first predetermined criterion does not need to be the same as the second predetermined criterion. For example, the constant value T3 may be different depending on whether the constant value T3 is applied to the detection information on a direct wave or the constant value T3 is applied to the detection information on an indirect wave.

At step 133, a step count which is a variable in the RAM of the control section 41 is decreased by 1. However, in order to prevent the step count from being smaller than zero, when the step count is zero, the step count is maintained at zero. Thus, only when the step count is greater than zero, the step count is decreased by 1. After step 133, the step detection ends. At step 134, a value of the step count is increased by 1, and then the step detection ends. The step count is reset to zero when the main process is started.

After the step detection at step 130, the control proceeds to step 140, and the control ECU 4 determines whether the step count is greater than a comparison value. The comparison value may be 1 or a natural number equal to or greater than 2. When the step count is greater than the comparison value, the control proceeds to step 142. When the step count is equal to or smaller than the comparison value, the control proceeds to step 146. Thus, by bypassing notification control at step 160 only when the step count is greater than the comparison value, a low step can be detected with higher accuracy.

At step 142, a value of the sensor output threshold is set to a first threshold. Specifically, as a new sensor output value, the first threshold is transmitted to the ultrasonic wave sensors 1R, 1RC, 1LC, and 1L. Thus, in the ultrasonic wave sensors 1R, 1RC, 1LC, and 1L, the first threshold transmitted from the control ECU 4 is used as the new sensor output threshold. After step 142, the control ECU 4 bypasses step 160 and ends the current transmission and reception process without notifying the occupant about the obstacle.

At step 146, a value of the sensor output threshold is set to a second threshold which is smaller than the first threshold. Specifically, as a new sensor output value, the second threshold is transmitted to the ultrasonic wave sensors 1R, 1RC, 1LC, and 1L. Thus, in the ultrasonic wave sensors 1R, 1RC, 1LC, and 1L, the second threshold transmitted from the control ECU 4 is used as the new sensor output threshold.

When the step count is equal to or smaller than the comparison value, the object by which the reflected wave has been generated is highly likely to be an object such as a wall to be avoided. In such a case, by setting the sensor output threshold to be smaller, the ultrasonic wave sensors 1R, 1RC, 1LC, and 1L more sensitively respond to the reflected wave and output detection information. In this manner, when an object about which the occupant should be notified is present, the ultrasonic wave sensors 1R, 1RC, 1LC, and 1L can detect the object at a higher frequency and in a wider detection range and output detection information. This allows useful information to be acquired at a higher frequency in a target to which the detection information is transmitted from the ultrasonic wave sensors 1R, 1RC, 1LC, and 1L. In addition to the control ECU 4, another device may be included in such targets to which the detection information is transmitted from the ultrasonic wave sensors 1R, 1RC, 1LC, and 1L. Examples of such a device include a brake control device that controls a brake of the vehicle according to a distance to an object.

At step 150 subsequent to step 146, the control ECU 4 determines whether the maximum amplitude is greater than the notification threshold Ib. The notification threshold which is a determination target may be a largest value or a smallest value of the maximum amplitudes in all the detection information acquired at immediately preceding step 120. Alternatively, the notification threshold which is the determination target may be an average value of the maximum amplitudes in all the detection information acquired at immediately preceding step 120. Thus, the notification threshold which is the determination target only needs to be a representative amount corresponding to the maximum amplitudes in all the detection information acquired at immediately preceding step 120.

When the control ECU 4 determines that the maximum amplitude which is a determination target is greater than the notification threshold Ib, the control proceeds to step 160. When the control ECU 4 determines that the maximum amplitude which is the determination target is equal to or smaller than the notification threshold Ib, the control ECU 4 bypasses step 160 and ends the current transmission and reception process without notifying the occupant about the obstacle.

At step 160, in order to notify the occupant about the obstacle, the notification control is performed. Specifically, in a mode corresponding to the detection distance (e.g., a cycle for generation of an alarm sound corresponding to the detection distance, a sound pressure of an alarm sound corresponding to the detection distance) of the reflected wave achieving the maximum amplitude leading to the determination at step 150 that notification is to be performed, the control ECU 4 causes the notification device 5 to perform notification using a sound or an image. After step 160, the current notification process ends.

As has been described, at steps 130 and 140, the control ECU 4 determines whether, in the change over time in the amplitude of the reflected wave from the object received by the microphone 11, the amplitude of the falling portion after the amplitude has reached the maximum value is greater than the predetermined criterion. Then, on the basis of the determination that the amplitude of the falling portion is greater than the predetermined criterion, the control ECU 4 includes the object in a notification target. Thus, the control ECU 4 causes the notification device 5 to notify the occupant about the object.

Furthermore, on the basis of the determination that the amplitude of the falling portion is not greater than the predetermined criterion, the control ECU 4 excludes the object from being a notification target. Thus, the control ECU 4 prohibits the notification device 5 from notifying the occupant about the object.

This is because, as described above, when the amplitude of the falling portion is greater than the predetermined criterion, the object is highly likely to be not a low step but an obstacle such as a wall to be avoided by the vehicle. In this manner, it is possible to reduce the probability to notify the occupant about a low step portion that does not need to be avoided by the vehicle.

Thus, on the basis of the determination that, in the change over time in the amplitude of the reflected wave from the object, the amplitude of the falling portion is greater than the predetermined criterion, the control ECU 4 performs a process in which the object is treated as an object to be avoided. In the present embodiment, the process in which the object is treated as an object to be avoided is the process of causing the notification device 5 to notify the occupant about the object.

Furthermore, on the basis of the determination that, in the change over time in the amplitude of the reflected wave from the object, the amplitude of the falling portion is smaller than the predetermined criterion, the control ECU 4 performs a process in which the object is treated as a low step. In the present embodiment, the process in which the object is treated as a low step is the process of excluding the object from being a notification target.

Thus, by excluding the object from being a notification target in response to the amplitude of the falling portion being greater than the predetermined criterion, the vehicle object detection device treats the object as an object to be avoided. Therefore, on the basis of a characteristic of a falling portion other than a maximal value in a change over time in an amplitude of a reflected wave, the object detection device can distinguish an object such as a wall to be avoided by the vehicle from a step portion that does not need to be avoided by the vehicle. This improves the probability of correctly distinguishing an object such as a wall from a step portion.

In the ultrasonic wave sensors 1R, 1RC, 1LC, and 1L, a size and directivity are usually in a trade-off relationship. In some cases, therefore, in order to improve appearance of the vehicle and the ease of mounting the ultrasonic wave sensors 1R, 1RC, 1LC, and 1L, the ultrasonic wave sensors 1R, 1RC, 1LC, and 1L are small in size. However, the ultrasonic wave sensors 1R, 1RC, 1LC, and 1L of smaller size have broader directivity. Thus, notification is more likely to be performed not only for an obstacle such as a wall for which notification is intended but also for a low step for which no notification is required.

With regard to this problem, in the technique described in JP 2014-215283 A, a plurality of ultrasonic wave sensors are mounted at different heights. Then, by comparing amplitudes obtained by the ultrasonic wave sensors, it is determined whether an object is a low step. However, if such a technique is applied to the right center ultrasonic wave sensor 1RC and the left center ultrasonic wave sensor 1LC of the present application, the ultrasonic wave sensors 1RC and 1LC are asymmetrically arranged with respect to a center in a horizontal direction of the vehicle, and this deteriorates appearance of the vehicle.

On the other hand, the method of the present embodiment does not limit the positions of the ultrasonic wave sensors 1R, 1RC, 1LC, and 1L. Therefore, the method of the present embodiment does not cause deterioration in appearance of the vehicle.

In the technique described in JP 2014-058247 A, according to a frequency of detecting an object, it is determined whether the object is a low step. In this method, however, accuracy is reduced unless the number of detections is large such as when the vehicle is passing by a parking space. On the other hand, in the method of the present embodiment, a reduction in accuracy due to a decrease in the number of detections of an object is less significant than in JP 2014-058247 A.

Second Embodiment

Next, a second embodiment will be described. The vehicle object detection device of the present embodiment has the same hardware configuration as the vehicle object detection device of the first embodiment. The vehicle object detection device of the present embodiment differs from the vehicle object detection device of the first embodiment in the content of the process performed by the control section 14 of the ultrasonic wave sensors 1R, 1RC, 1LC, and 1L and the content of the step detection performed by the control ECU 4.

Figure 14:
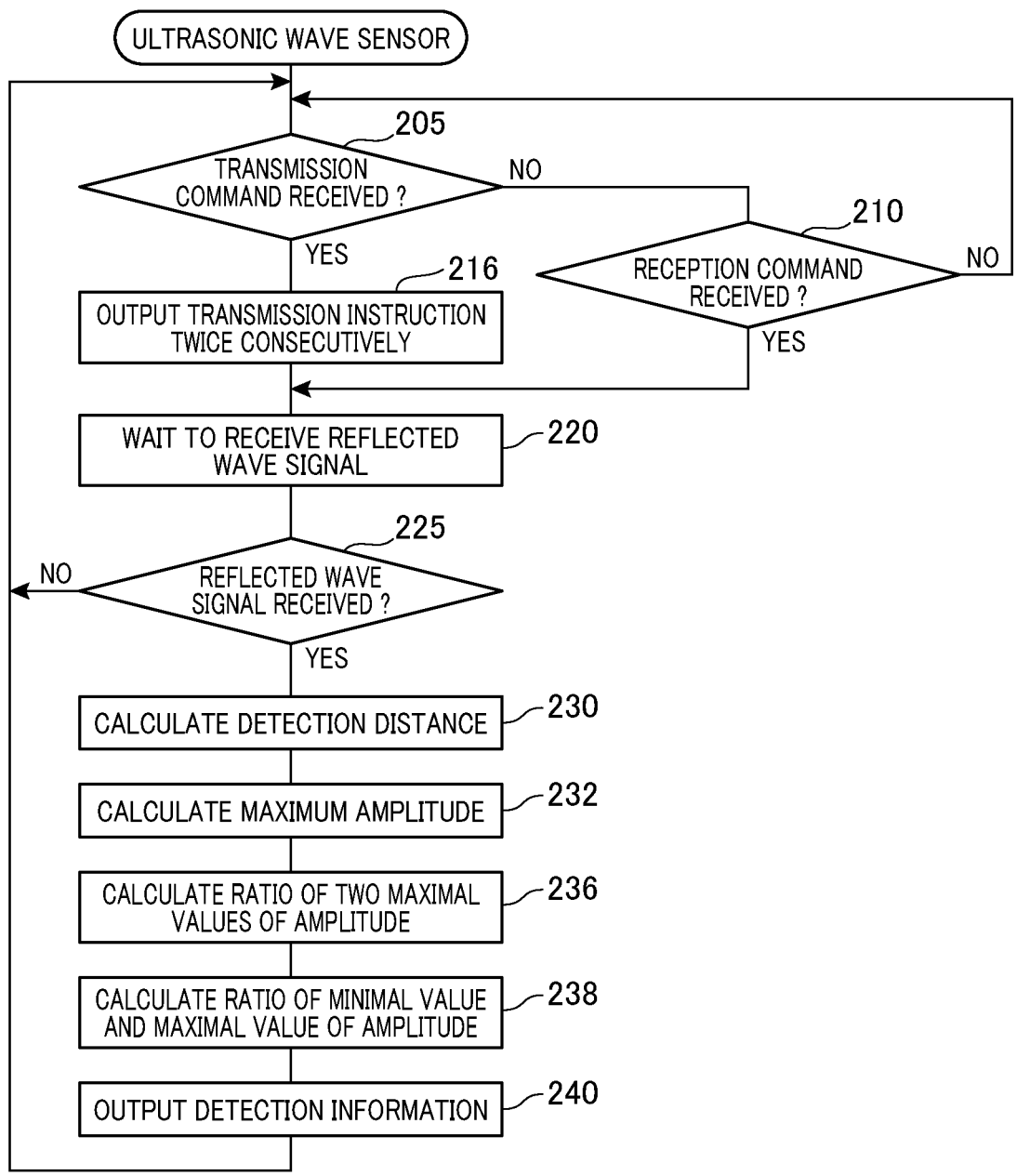
FIG. 14 is a flow chart of a process performed by the control section of the ultrasonic wave sensors of a second embodiment.

Specifically, the control section 14 of the ultrasonic wave sensors 1R, 1RC, 1LC, and 1L performs a process in FIG. 14 instead of the process in FIG. 8. Furthermore, in the step detection at step 130, the control ECU 4 performs a process in FIG. 15 instead of the process in FIG. 7.

The process in FIG. 14 differs from the process in FIG. 8 in that step 215 is replaced with step 216 and step 235 is replaced with steps 236 and 238. The steps given the same step number in the processes in FIGS. 8 and 14 are the same unless otherwise specified.

At step 205, when the control section 14 of the ultrasonic wave sensors 1R, 1RC, 1LC, and 1L determines that a transmission command has been received, the control proceeds to step 216. At step 216, a transmission instruction signal is outputted twice consecutively to the transmission circuit 12 belonging to the same ultrasonic wave sensor as the ultrasonic wave sensor to which the control section 14 belongs. A timing of outputting a second transmission instruction signal is delayed by a predetermined delay time from a timing of outputting a first transmission instruction signal. The delay time is determined in advance as a time equal to or longer than a duration of a single pulse signal outputted from the transmission circuit 12 to the microphone 11 of the ultrasonic wave sensors 1R, 1RC, 1LC, and 1L. The delay time is, for example, shorter than twice the duration of a single pulse signal. Furthermore, the delay time is more preferably shorter than 1.5 times the duration of a single pulse signal.

In another aspect, within a reference interval after transmission of a transmission wave 71 is ended, transmission of a transmission wave 72 is started. The reference interval is more preferably, for example, shorter than the duration of a single pulse signal. Furthermore, the reference interval is more preferably, for example, shorter than half the duration of a single pulse signal. The duration of a single pulse signal is the same as a duration of the transmission wave 71, and the same as a duration of the transmission wave 72.

Thus, the transmission circuit 12 generates a pulse signal twice consecutively, and outputs the pulse signal twice consecutively to the microphone 11 belonging to the same ultrasonic wave sensor as the ultrasonic wave sensor to which the transmission circuit 12 belongs. The microphone 11 is driven by the pulse signals, and as shown in FIG. 16, the microphone 11 transmits a transmission wave twice consecutively.

Figure 16:
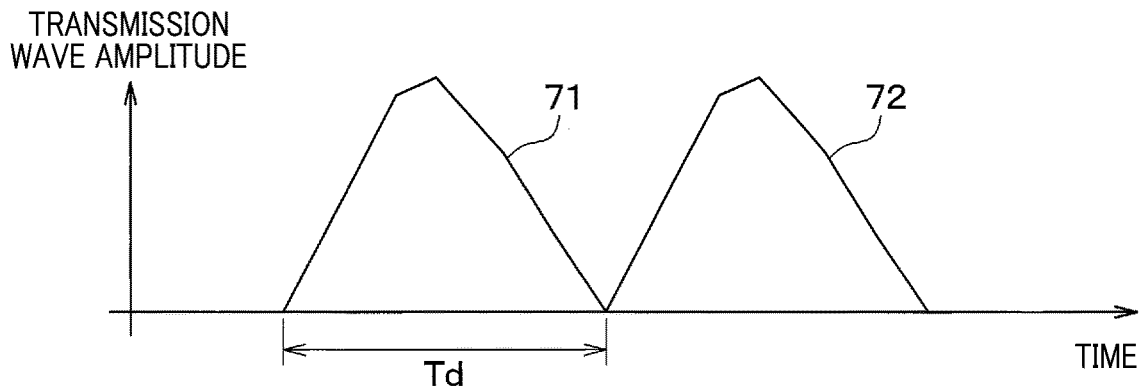
FIG. 16 is a graph showing a change over time in an amplitude of a transmission wave.

A solid line 71 in FIG. 16 is an envelope of the first transmission wave and indicates a change over time in an amplitude of the first transmission wave. A solid line 72 in FIG. 16 is an envelope of the second transmission wave and indicates a change over time in an amplitude of the second transmission wave. In the example in FIG. 16, a delay time Td is the same as the duration of a single pulse signal. The second transmission wave 72 corresponds to an additional transmission wave.

Figure 17:
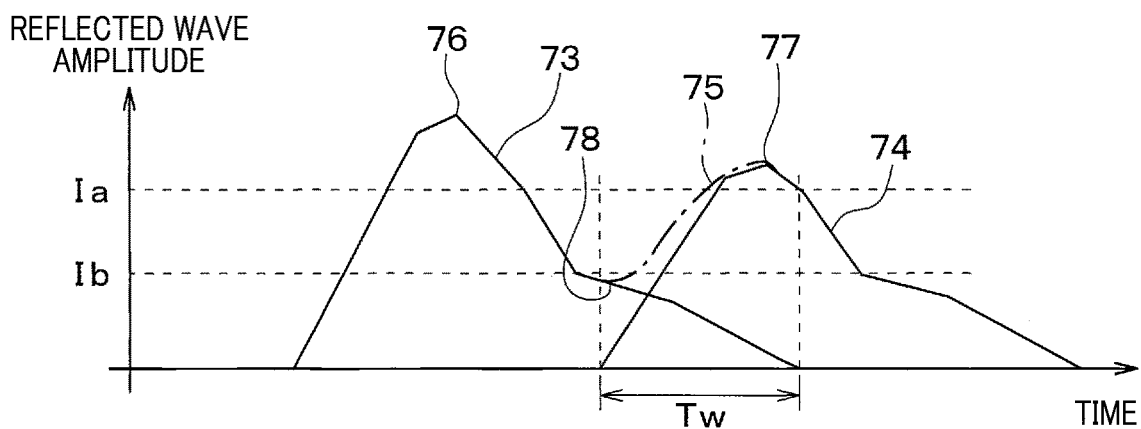
FIG. 17 is a graph showing a change over time in an amplitude of a reflected wave.

The transmission of the transmission wave performed twice consecutively leads to, as shown in FIG. 17, generation of a reflected wave 73 generated by reflection, by an object, of the first transmission wave incident on the object and a reflected wave 74 generated by reflection, by an object, of the second transmission wave incident on the object. The reflected waves 73 and 74 are received as a direct wave by the ultrasonic wave sensor that has received the transmission instruction signal, and are received as an indirect wave by the ultrasonic wave sensor that has received a reception instruction signal.

In FIG. 17, envelopes of the reflected waves 73 and 74, i.e., changes over time in an amplitude of the reflected waves 73 and 74, are indicated by solid lines.

In the example in FIG. 17, the object on which the transmission waves 71 and 72 are incident is not a low step but a wall or like to be avoided by the vehicle. In the example in FIG. 17, therefore, an overlap period Tw in which both the reflected waves 73 and 74 are received is present. On the other hand, when the object on which the transmission waves 71 and 72 are incident is a low step, the overlap period Tw in which both the reflected waves 73 and 74 are received is not present. This is because, as compared with a reflected wave from a low step, in a reflected wave from a wall or the like, an amplitude of a falling portion is greater and a duration of a tail portion is longer.

When the overlap period Tw is present, the ultrasonic wave sensor that receives the reflected waves 73 and 74 receives a composite wave of the reflected waves 73 and 74. In FIG. 17, a composite wave in the overlap period Tw is indicated by a dot-dash line 75. A composite wave in a time period before the overlap period Tw is the same as the reflected wave 73. A composite wave in a time period before the overlap period Tw is the same as the reflected wave 74.

In the overlap period Tw, an amplitude of the composite wave 75 is not necessarily the sum of the amplitude of the reflected wave 73 and the amplitude of the reflected wave 74. This is because a phase of the reflected wave 73 does not necessarily coincide with a phase of the reflected wave 74. In the overlap period Tw, however, the amplitude of the composite wave 75 is almost always greater than the amplitude of the reflected wave 73. Furthermore, the overlap period Tw overlaps a time period of a falling portion of the reflected wave 73.

At steps 220, 225, 230, 232, 236, and 238, the control section 14 treats the composite wave as a reflected wave. After calculating a maximum amplitude at step 232, at step 236, the control section 14 calculates a ratio between two maximal values 76 and 77 of the amplitude of the reflected wave. The two maximal values may be a largest maximal value 76 and a second largest maximal value 77 in a change over time in the amplitude of the composite wave. Alternatively, the two maximal values may be a maximal value 76 generated at an earliest timing and a maximal value 77 generated at a second earliest timing among maximal values greater than a predetermined reference value in the change over time in the amplitude of the composite wave.

In the latter case, the reference value may be equal to or smaller than the specified value Ia. In the former case, the second largest maximal value 77 may be considered as the reference value. Thus, the two maximal values are two maximal values equal to or greater than the reference value in the change over time in the amplitude of the composite wave.

The two maximal values 76 and 77 are the same as maximal values of the reflected waves 73 and 74, respectively. When the ratio between the maximal values is close to 1, therefore, the two reflected waves 73 and 74 are highly likely to be reflected waves from the same object. When the two reflected waves 73 and 74 are reflected waves from different objects, correlation is low between the presence or absence of the overlap period Tw and a shape of the object by which the reflected wave 73 has been generated. The reflected wave 74 corresponds to an additional reflected wave.

At step 238 subsequent to step 236, the control section 14 calculates a ratio between a minimal value and a maximal value of the amplitude in the change over time in the reflected wave. The minimal value used for the calculation is a minimal value 78 which is smallest among the amplitudes of the composite wave in a time period between time points at which the amplitude has reached the respective two maximal values 76 and 77. Furthermore, the maximal value used for the calculation may be the maximal value 76, the maximal value 77, or a value based on the maximal values 76 and 77 (e.g., an average value of the maximal values 76 and 77).

When the ratio between the minimal value and the maximal value is large, i.e., when the minimal value is large, the overlap period Tw is highly likely to be present. This is because when the overlap period Tw is not present, the minimal value should be zero.

Similarly to the first embodiment, detection information transmitted at subsequent step 240 from the control section 14 to the control ECU 4 includes the detection distance calculated at immediately preceding step 230 and the maximum amplitude calculated at immediately preceding step 232. The detection information further includes the ratio between the two maximal values calculated at immediately preceding step 236 and the ratio between the minimal value and the maximal value calculated at immediately preceding step 238.

Next, the step detection at step 130 performed by the control ECU 4 will be described. In the step detection, first, at step 135, the control ECU 4 extracts, as a detection target, one of the detection information acquired at immediately preceding step 120. Any of the detection information may be extracted as the detection target. For example, the detection information on a direct wave may be more preferentially extracted than the detection information on an indirect wave. Conversely, the detection information on an indirect wave may be more preferentially extracted than the detection information on a direct wave.

Furthermore, at step 135, information on the ratio between the two maximal values is read from the detection information which is the detection target. Then, it is determined whether the read ratio is in a predetermined range including 1 (e.g., in the range of 0.9 or more and 1.1 or less). When the read ratio is in the predetermined range, the control proceeds to step 136, and when the read ratio is not in the predetermined range, the control proceeds to step 137.

At step 136, information on the ratio between the minimal value and the maximal value is read from the detection information which is the detection target. Then, it is determined whether the read ratio is greater than a determination value. The determination value may be equal to or greater than zero. For example, the determination value may be equal to or smaller than 1/10 the maximum amplitude. When the read ratio is greater than the determination value, the control proceeds to step 137. When the read ratio is equal to or smaller than the determination value, the control proceeds to step 138.

At step 137, the step count is reset to zero, and then the step detection ends. At step 138, a value of the step count is increased by 1, and then the step detection ends.

Thus, when the ratio between the two maximal values is in the predetermined range and the ratio between the minimal value and the maximal value is equal to or smaller than the determination value, the control ECU 4 increases the step count.

The reason that the step count is increased when the ratio between the minimal value and the maximal value is equal to or smaller than the determination value is that, as described above, it is highly likely that the overlap period Tw is not present, and thus the reflected wave 73 is highly likely to have been generated by a low step portion that does not need to be avoided.

Furthermore, the reason that the step count is increased only when the ratio between the two maximal values is in the predetermined range is that when the ratio between the two maximal values is out of the predetermined range, the two reflected waves 73 and 74 are highly likely to be reflected waves from different objects. As described above, when the two reflected waves 73 and 74 are reflected waves from different objects, correlation is low between the presence or absence of the overlap period Tw and a shape of the object by which the reflected wave 73 has been generated.

The step count is used in the same manner as in the first embodiment. Thus, in response to the amplitude of the falling portion of the reflected wave 73 being greater than the predetermined criterion, the vehicle object detection device treats the object as an object to be avoided. Therefore, effects similar to those of the first embodiment can be obtained.

Furthermore, when the reflected waves 73 and 74 have been generated by a wall, there is a time period in which the falling portion of the reflected wave 73 and the reflected wave 74 are both generated. Thus, in the time period, the amplitude of the composite wave 75 is highly likely to be greater than that of the reflected wave 73. This facilitates detection of the amplitude of the falling portion of the reflected wave 73.

Third Embodiment

Next, a third embodiment will be described. In the present embodiment, the content of the step detection process at step 130 is changed from that of the first embodiment. Specifically, when the control ECU 4 has acquired at immediately preceding step 120 all the detection information on a direct wave and the detection information on two indirect waves, in the step detection process at step 130, the control ECU 4 performs a process shown in FIG. 18.

Figure 18:
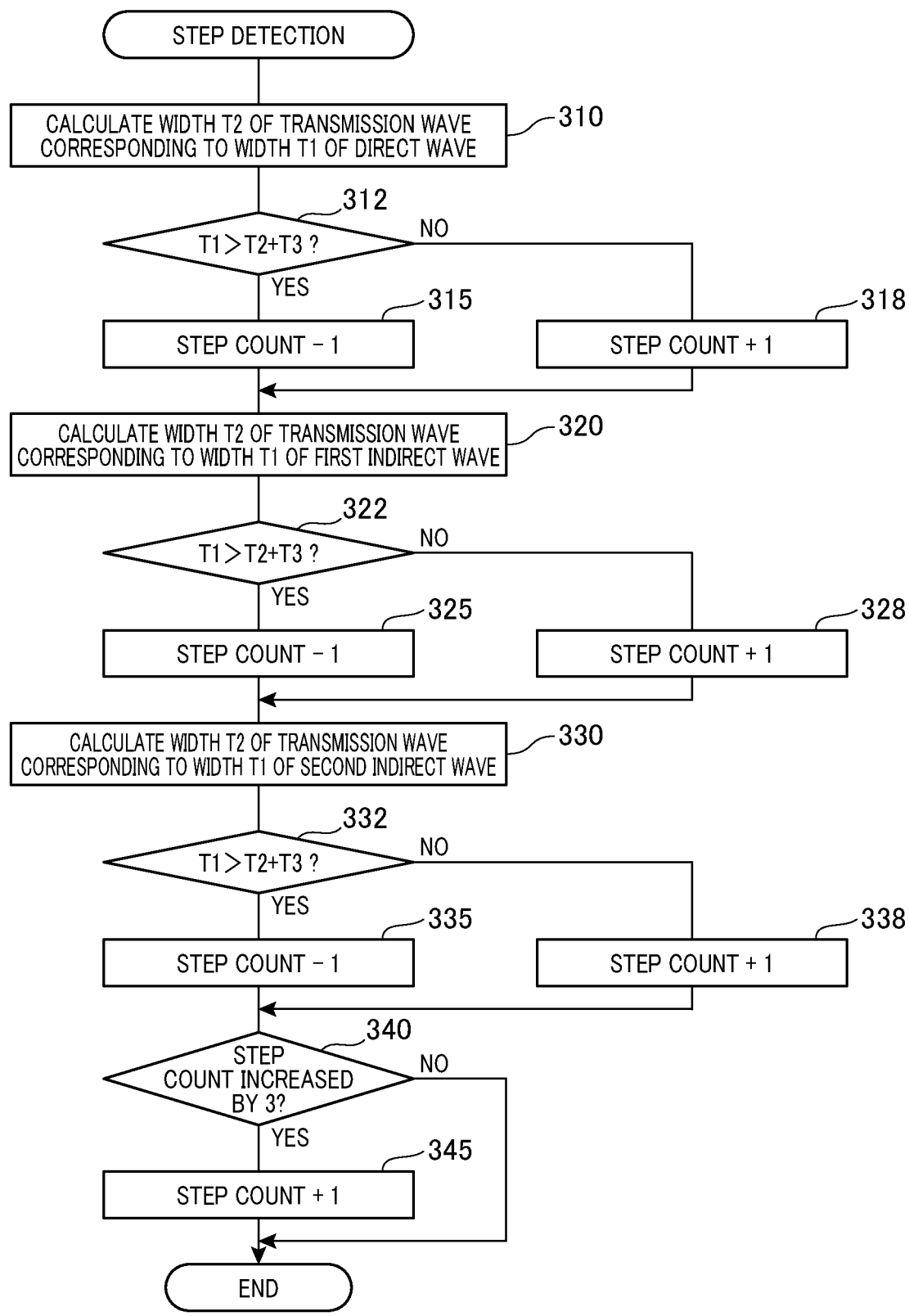
FIG. 18 is a flow chart of a step detection process of a third embodiment.

In the process in FIG. 18, first, at step 310, the control ECU 4 reads a duration T1 included in the detection information on a direct wave acquired at immediately preceding step 120. Then, the control ECU 4 calculates a duration T2 of a transmission wave corresponding to the read duration T1. A method of calculating the duration T2 of the transmission wave corresponding to the duration T1 is the same as at step 131 of the first embodiment.

Subsequently, at step 312, the control ECU 4 determines whether the duration T1 is longer than a reference length. The reference length is a value obtained by adding a constant value T3 to the duration T2 corresponding to the duration T1 which is a comparison target. Then, the control ECU 4 determines whether the duration T1 is greater than the reference length T2+T3. When the duration T1 is greater than the reference length T2+T3, the control proceeds to step 315, and when the duration T1 is not greater than the reference length T2+T3, the control proceeds to step 318.

At step 315, a value of the step count is decreased by 1. However, in order to prevent the step count from being smaller than zero, when the step count is zero, the step count is maintained at zero. Thus, only when the step count is greater than zero, the step count is decreased by 1. After step 315, the control proceeds to step 320. At step 318, a value of the step count is increased by 1, and then the control proceeds to step 320.

At step 320, the control ECU 4 reads a duration T1 included in the detection information on the first indirect wave of the two indirect waves acquired at immediately preceding step 120. Then, the control ECU 4 calculates a duration T2 of a transmission wave corresponding to the read duration T1. A method of calculating the duration T2 of the transmission wave corresponding to the duration T1 is the same as at step 131 of the first embodiment.

Subsequently, at step 322, the control ECU 4 determines whether the duration T1 is longer than a reference length. The reference length is a value obtained by adding a constant value T3 to the duration T2 corresponding to the duration T1 which is a comparison target. Then, the control ECU 4 determines whether the duration T1 is greater than the reference length T2+T3. When the duration T1 is greater than the reference length T2+T3, the control proceeds to step 325, and when the duration T1 is not greater than the reference length T2+T3, the control proceeds to step 328.

At step 325, a value of the step count is decreased by 1. However, in order to prevent the step count from being smaller than zero, when the step count is zero, the step count is maintained at zero. Thus, only when the step count is greater than zero, the step count is decreased by 1. After step 325, the control proceeds to step 330. At step 328, a value of the step count is increased by 1, and then the control proceeds to step 330.

At step 330, the control ECU 4 reads a duration T1 included in the detection information on the second indirect wave of the two indirect waves acquired at immediately preceding step 120. Then, the control ECU 4 calculates a duration T2 of a transmission wave corresponding to the read duration T1. A method of calculating the duration T2 of the transmission wave corresponding to the duration T1 is the same as at step 131 of the first embodiment.

Subsequently, at step 332, the control ECU 4 determines whether the duration T1 is longer than a reference length. The reference length is a value obtained by adding a constant value T3 to the duration T2 corresponding to the duration T1 which is a comparison target. Then, the control ECU 4 determines whether the duration T1 is greater than the reference length T2+T3. When the duration T1 is greater than the reference length T2+T3, the control proceeds to step 335, and when the duration T1 is not greater than the reference length T2+T3, the control proceeds to step 338.

At step 335, a value of the step count is decreased by 1. However, in order to prevent the step count from being smaller than zero, when the step count is zero, the step count is maintained at zero. Thus, only when the step count is greater than zero, the step count is decreased by 1. After step 335, the control proceeds to step 340. At step 338, a value of the step count is increased by 1, and then the control proceeds to step 340.

At step 340, it is determined whether the step count has been increased by 3 from the start of current step 130. When the step count has been increased by 3, the control proceeds to step 345, and when the step count has not been increased by 3, step 345 is bypassed and the current step detection ends. At step 345, a value of the step count is increased by 1, and the current step detection ends.

The increase by 3 in the step count means that at current step 130, all steps 318, 328, and 338 have been performed. In such a case, the object by which the reflected wave has been generated is extremely likely to be a low step. Accordingly, the step count is increased to be greater than the simple sum of counts based on the individual detection information. In this manner, when the object by which the reflected wave has been generated is extremely likely to be a low step, operation corresponding to the low step can be promptly performed.

Thus, in the present embodiment, the control ECU 4 determines whether an amplitude of a corresponding falling portion corresponding to each of the plurality of microphones 11 is greater than a corresponding predetermined criterion.

In the group G1 transmission and reception process, the plurality of microphones 11 are the microphones 11 of the right ultrasonic wave sensor 1R, the right center ultrasonic wave sensor 1RC, and the left center ultrasonic wave sensor 1LC. Furthermore, in the group G2 transmission and reception process, the plurality of microphones 11 are the microphones 11 of the right center ultrasonic wave sensor 1RC, the left center ultrasonic wave sensor 1LC, and the left ultrasonic wave sensor 1L.

The "corresponding falling portion" is a falling portion in a change over time in an amplitude of a reflected wave received by each of the plurality of microphones 11. Furthermore, the "corresponding predetermined criterion" is a corresponding one of a plurality of predetermined criteria corresponding to each of the plurality of microphones 11. In the present embodiment, in any of the microphones 11, the "corresponding predetermined criterion" is T1>T2+T3. However, the "corresponding predetermined criterion" may be different for each of the microphones 11.

When the amplitude of the corresponding falling portion is greater than the corresponding predetermined criterion, the control ECU 4 increases the step count by a corresponding increase value. Furthermore, when the amplitude of the corresponding falling portion is not greater than the corresponding predetermined criterion, the control ECU 4 decreases the step count by a corresponding decrease value.

The "corresponding increase value" is a corresponding one of a plurality of increase values corresponding to each of the plurality of microphones 11. In the present embodiment, in any of the microphones 11, the "corresponding increase value" is 1. However, the "corresponding increase value" may be different for each of the microphones 11. Furthermore, the "corresponding decrease value" is a corresponding one of a plurality of decrease values corresponding to each of the plurality of microphones 11. In the present embodiment, in any of the microphones 11, the "corresponding decrease value" is 1. However, the "corresponding decrease value" may be different for each of the microphones 11.

In the first, second, and third embodiments, the control ECU 4 functions as a determination section by performing steps 130 and 140, and functions as a processing section by performing steps 142, 146, 150, and 160.

Other Embodiments

The present disclosure is not limited to the above embodiments and can be changed as appropriate. The above embodiments are not irrelevant to each other and can be combined as appropriate unless the combination is apparently impossible. In the above embodiments, an element constituting the embodiments is not necessarily essential unless, for example, the element is explicitly stated to be particularly essential or the element is considered to be apparently essential in principle. In the above embodiments, when a numerical value such as the number, numerical value, amount, or range associated with the components of the embodiments is mentioned, the numerical value is not limited to the specific number unless, for example, the numerical value is explicitly stated to be particularly essential or the numerical value is apparently limited to the specific number in principle. In particular, when a plurality of values for an amount are exemplified, values between the plurality of values can be adopted unless particularly otherwise specified or the values are apparently impossible in principle. In the above embodiments, when a shape, positional relationship, or the like of a component or the like is mentioned, the shape, positional relationship, or the like is not limited to the specific shape, positional relationship, or the like unless, for example, particularly explicitly stated or the shape, positional relationship, or the like is limited to the specific shape, positional relationship, or the like in principle. The present disclosure encompasses modifications as below of the above embodiments and modifications within an equivalent scope. The modifications below can be selectively and independently applied to the above embodiments. Thus, any combination of the modifications is applicable to the above embodiments.

Modified Example 1

Figure 15:
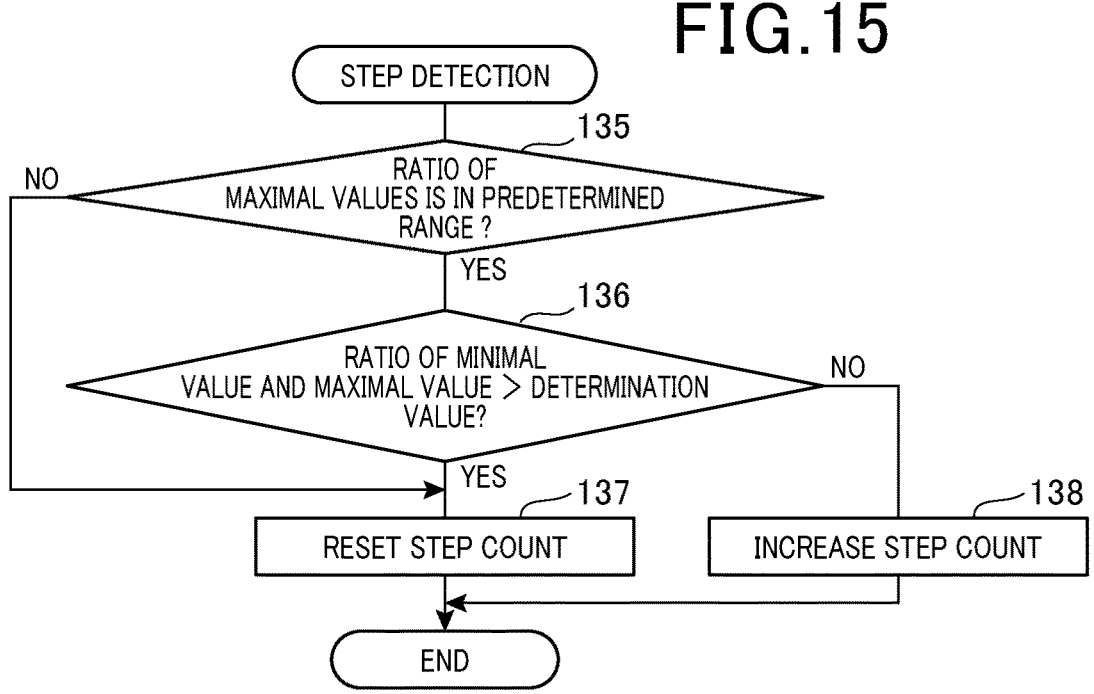
FIG. 15 is a flow chart of a step detection process.

The control ECU 4 may perform both the step detection in FIG. 7 of the first embodiment and the step detection in FIG. 15 of the second embodiment. In this case, the control section 14 of the ultrasonic wave sensors 1R, 1RC, 1LC, and 1L transmits, to the control ECU 4, detection information including both information necessary for the step detection of the first embodiment and information necessary for the step detection of the second embodiment.

When the step count is increased in the step detection in FIG. 7 and in the step detection in FIG. 15 of the second embodiment for the same detection information, the control ECU 4 decreases the value of the step count by 1 from the step count which has been increased by 2. Thus, in the step detection in FIGS. 7 and 8 as a whole, only when a negative determination is made at step 132 in FIG. 7 and a negative determination is made at step 136 in FIG. 15, the step count is increased by 1.

When the step count is reset in at least one of the step detection in FIG. 7 and the step detection in FIG. 15, the control ECU 4 resets the step count to zero also in the step detection in FIGS. 7 and 8 as a whole. In this manner, accuracy of the step detection is further improved.

Modified Example 2

In the above embodiments, the microphones 11 of the ultrasonic wave sensors 1R, 1RC, 1LC, and 1L are all arranged at the same height. However, even when the microphones 11 of the ultrasonic wave sensors 1R, 1RC, 1LC, and 1L are arranged at respective different heights, the method of detecting a low step portion of the present disclosure is effective.

Modified Example 3

The comparison value used at step 140 of the above embodiments may be zero.

Modified Example 4

The above embodiments show, as an example of the process in which an object is treated as an object to be avoided, the process of deeming the object to be the notification target. Alternatively, however, the process in which the object is treated as an object to be avoided may be a process in which information on the object is flagged as an object to be avoided and stored in a nonvolatile storage medium such as a flash memory.

Furthermore, the above embodiments show, as an example of the process in which an object is treated as a low step portion, the process of excluding the object from being a notification target. Alternatively, however, the process in which the object is treated as a low step may be a process in which information on the object is flagged as a step and stored in a nonvolatile storage medium such as a flash memory. In this case, the flag indicating the step has a different value from the flag indicating the object to be avoided.

Modified Example 5

In the object detection device of the above embodiments, the transmission wave and the reflected wave are ultrasonic waves. However, the object detection device may use millimeter waves as the transmission wave and the reflected wave.

Modified Example 6

At step 133, the control ECU 4 may reset the step count to zero, regardless of a current value of the step count. For example, when the current value of the step count is 3, the step count may be reset to zero.

According to an aspect of the present disclosure, an object detection device includes: a wave receiver (11) that receives a reflected wave generated by reflection, by an object, of a transmission wave incident on the object; a determination section (130, 140) that determines whether, in a change over time in an amplitude of the reflected wave received by the wave receiver, an amplitude of a falling portion is greater than a predetermined criterion, the amplitude of the falling portion being decreased after the amplitude has reached a maximum value; and a processing section (142, 146, 150, 160) that, on the basis of a determination by the determination section that the amplitude of the falling portion is greater than the predetermined criterion, performs a process in which the object is treated as an object to be avoided.

Thus, in response to the amplitude of the falling portion being greater than the predetermined criterion, the object detection device treats the object as an object to be avoided. Therefore, on the basis of a characteristic of a falling portion other than a maximal value in a change over time in an amplitude of a reflected wave, the object detection device can distinguish an object such as a wall to be avoided by the vehicle from a step portion that does not need to be avoided by the vehicle.

What is claimed is:

1. An object detection device comprising:
    a wave receiver that receives a reflected wave generated by reflection, by an object, of a transmission wave incident on the object;
    a determination section that determines whether, in a change over time in an amplitude of the reflected wave received by the wave receiver, an amplitude of a falling portion is greater than a predetermined criterion, the amplitude of the falling portion being decreased after the amplitude has reached a maximum value; and
    a processing section that, on the basis of a determination by the determination section that the amplitude of the falling portion is greater than the predetermined criterion, performs a process in which the object is treated as an object to be avoided, wherein
    the wave receiver receives an additional reflected wave generated by reflection, by an object, of an additional transmission wave incident on the object, transmission of the additional transmission wave being started within a predetermined reference interval after transmission of the transmission wave is ended, and
    on the basis of an amplitude of a composite wave in a time period between time points at which the amplitude has reached respective two maximal values in a change over time in the amplitude of the composite wave, the determination section determines whether the amplitude of the falling portion is greater than the predetermined criterion, the composite wave being a combination of the reflected wave and the additional reflected wave, the two maximal values being equal to or greater than a reference value.

2. The object detection device according to claim 1, wherein in response to a duration being longer than a reference length, the determination section determines that the amplitude of the falling portion is greater than the predetermined criterion, the duration being a time from a time point at which the amplitude is increased to a first value before the falling portion to a time point at which the amplitude is decreased to a second value in the falling portion.

3. The object detection device according to claim 1, wherein in response to a minimal value in the time period between the time points exceeding a determination value, the determination section determines that the amplitude of the falling portion is greater than the predetermined criterion.

4. The object detection device according to claim 1, wherein when a ratio between a largest maximal value of the amplitude and a second largest maximal value of the amplitude is in a predetermined range, on the basis of the amplitude in the time period between the time points, the determination section determines whether the amplitude of the falling portion is greater than the predetermined criterion.

5. The object detection device according to claim 1, wherein
    in response to the maximum value being greater than a specified value, the determination section determines whether the amplitude of the falling portion is greater than the predetermined criterion, and
    in response to the maximum value being equal to or lower than the specified value, the determination section does not determine whether the amplitude of the falling portion is greater than the predetermined criterion.

6. An object detection device comprising:
    a wave receiver that receives a reflected wave generated by reflection, by an object, of a transmission wave incident on the object;
    a determination section that determines whether, in a change over time in an amplitude of the reflected wave received by the wave receiver, an amplitude of a falling portion is greater than a predetermined criterion, the amplitude of the falling portion being decreased after the amplitude has reached a maximum value; and
    a processing section that, on the basis of a determination by the determination section that the amplitude of the falling portion is greater than the predetermined criterion, performs a process in which the object is treated as an object to be avoided, wherein
    in response to the number of times that the determination section has determined that the amplitude of the falling portion is greater than the predetermined criterion exceeding a comparison value, the processing section performs the process in which the object is treated as an object to be avoided, and
    in response to the number of times that the determination section has determined that the amplitude of the falling portion is greater than the predetermined criterion not exceeding the comparison value, the processing section does not treat the object as an object to be avoided.

7. An object detection device comprising:
    a wave receiver that receives a reflected wave generated by reflection, by an object, of a transmission wave incident on the object;
    a determination section that determines whether, in a change over time in an amplitude of the reflected wave received by the wave receiver, an amplitude of a falling portion is greater than a predetermined criterion, the amplitude of the falling portion being decreased after the amplitude has reached a maximum value; and
    a processing section that, on the basis of a determination by the determination section that the amplitude of the falling portion is greater than the predetermined criterion, performs a process in which the object is treated as an object to be avoided, wherein
    the falling portion is a first falling portion, the predetermined criterion is a first predetermined criterion, the wave receiver is a first wave receiver, the first wave receiver transmits the transmission wave, a second wave receiver also receives the reflected wave, the second wave receiver being arranged at a different position from the first wave receiver, the determination section determines whether an amplitude of the first falling portion is greater than the first predetermined criterion, and determines whether, in a change over time in an amplitude of the reflected wave received by the second wave receiver, an amplitude of a second falling portion after the amplitude has reached a maximum value is greater than a second predetermined criterion, in response to a determination by the determination section that the amplitude of the first falling portion is greater than the first predetermined criterion and the amplitude of the second falling portion is greater than the second predetermined criterion, the processing section performs the process in which the object is treated as an object to be avoided, and in response to one or both of a condition that the amplitude of the first falling portion is greater than the first predetermined criterion and a condition that the amplitude of the second falling portion is greater than the second predetermined criterion not being satisfied, the processing section does not treat the object as an object to be avoided.

8. An object detection device comprising:

a wave receiver that receives a reflected wave generated by reflection, by an object, of a transmission wave incident on the object;

a determination section that determines whether, in a change over time in an amplitude of the reflected wave received by the wave receiver, an amplitude of a falling portion is greater than a predetermined criterion, the amplitude of the falling portion being decreased after the amplitude has reached a maximum value; and a processing section that, on the basis of a determination by the determination section that the amplitude of the falling portion is greater than the predetermined criterion, performs a process in which the object is treated as an object to be avoided, wherein the predetermined criterion is one of a plurality of predetermined criteria, the wave receiver is a first wave receiver of a plurality of wave receivers, the first wave receiver transmits the transmission wave, all wave receivers of the plurality of wave receivers other than the first wave receiver also receive the reflected wave, in a change over time in an amplitude of the reflected wave received by each of the plurality of wave receivers, when an amplitude of a corresponding falling portion after the amplitude has reached a maximum value is greater than a corresponding one of the plurality of predetermined criteria, the determination section increases a step count by a corresponding one of a plurality of increase values, and when the amplitude of the corresponding falling portion is not greater than the corresponding one of the plurality of predetermined criteria, the determination section decreases the step count by a corresponding one of a plurality of decrease values, in all changes over time in an amplitude of the reflected wave received by the plurality of wave receivers, when an amplitude of a corresponding falling portion after the amplitude has reached a maximum value is greater than a corresponding one of the plurality of predetermined criteria, the determination section increases the step count by a value greater than a sum total of the plurality of increase values, and in response to the step count not being greater than a comparison value, the processing section performs the process in which the object is treated as an object to be avoided, and in response to the step count being greater than the comparison value, the processing section does not treat the object as an object to be avoided.

* * * * *